(12) United States Patent
Gonzalez Franco et al.

(10) Patent No.: US 11,556,168 B2
(45) Date of Patent: Jan. 17, 2023

(54) MULTILAYER CONTROLLER

(71) Applicant: Microsoft Technology Licensing, LLC, Redmond, WA (US)

(72) Inventors: Mar Gonzalez Franco, Seattle, WA (US); Michael Jack Sinclair, Kirkland, WA (US); Eyal Ofek, Redmond, WA (US); Eric Jordan Gonzalez, Stanford, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 7 days.

(21) Appl. No.: 17/146,402

(22) Filed: Jan. 11, 2021

(65) Prior Publication Data
US 2022/0221928 A1 Jul. 14, 2022

(51) Int. Cl.
*A63F 13/24* (2014.01)
*G06F 3/01* (2006.01)

(52) U.S. Cl.
CPC .............. *G06F 3/011* (2013.01); *A63F 13/24* (2014.09)

(58) Field of Classification Search
CPC .......... A63F 13/24; G06F 3/011; G06F 3/014; G06F 3/016
See application file for complete search history.

(56) References Cited

U.S. PATENT DOCUMENTS

| | | | |
|---|---|---|---|
| 5,024,031 A | 6/1991 | Hoberman | |
| 2008/0214306 A1* | 9/2008 | Ludden | .................. A63F 13/06 463/37 |
| 2013/0059696 A1* | 3/2013 | Hijmans | .......... A63B 23/03525 482/8 |
| 2014/0200085 A1* | 7/2014 | Bares | ...................... A63F 13/98 463/47 |
| 2015/0031456 A1* | 1/2015 | Dascher | ................ A63F 13/285 463/38 |
| 2017/0216670 A1* | 8/2017 | Kuroda | .............. A63B 21/4035 |
| 2018/0361234 A1 | 12/2018 | Nietfeld et al. | |
| 2019/0124189 A1 | 4/2019 | Grant et al. | |
| 2019/0159714 A1* | 5/2019 | Nagasu | .............. A63B 24/0062 |
| 2019/0314721 A1* | 10/2019 | Nakayama | .............. G06F 3/033 |

FOREIGN PATENT DOCUMENTS

WO 2020131050 A1 6/2020

OTHER PUBLICATIONS

"Dexmo", Retrieved From: hhttps://web.archive.org/web/20200430231806if_/https://origin.dextarobotics.com/en-us, Apr. 30, 2020, 6 Pages.

(Continued)

*Primary Examiner* — David L Lewis
*Assistant Examiner* — S. N. H.
(74) *Attorney, Agent, or Firm* — Rainier Patents, P.S.

(57) ABSTRACT

The present concepts relate to devices that can employ graspable controllers that can be employed in various scenarios, such as virtual reality scenarios and augmented reality scenarios. One example device can include multiple expansion assemblies having independently adjustable girths. The multiple expansion assemblies can be stacked adjacent to one another along an axis. A controller can be configured to expand or contract the girths of the expansion assemblies to collectively approximate girths of an object.

20 Claims, 14 Drawing Sheets

(56) References Cited

OTHER PUBLICATIONS

"Haptx", Retrieved From:https://web.archive.org/web/20201101143517/https://haptx.com/, Nov. 1, 2020, 11 Pages.

"Vive", Retrieved From: https://web.archive.org/web/20201031114417/https://www.vive.com/us/, Oct. 31, 2020, 2020, 3 Pages.

Azmandian, et al., "Haptic Retargeting: Dynamic Repurposing of Passive Haptics for Enhanced Virtual Reality Experiences", In Proceedings of the CHI Conference on Human Factors in Computing Systems, May 7, 2016, pp. 1968-1979.

Benko, et al., "NormalTouch and TextureTouch: High-fidelity 3D Haptic Shape Rendering on Handheld Virtual Reality Controllers", In Proceedings of the 29th Annual Symposium on User Interface Software and Technology, Oct. 16, 2016, pp. 717-728.

Berger, et al., "The uncanny valley of haptics", In Journal of Science Robotics, vol. 3, Issue 17, Apr. 18, 2018, 13 Pages.

Blake, et al., "Haptic Glove with MR Brakes for Virtual Reality", In Journal of IEEE/ASME Transactions on Mechatronics, vol. 14, Issue 5, Oct. 1, 2009, pp. 606-615.

Bouzit, et al., "The rutgers master ii-new design force-feedback glove", In Journal of IEEE/ASME Transactions on mechatronics., Jun. 2002, pp. 256-263.

Choi, et al., "CLAW: A Multifunctional Handheld Haptic Controller for Grasping, Touching, and Triggering in Virtual Reality", In Proceedings of the CHI Conference on Human Factors in Computing Systems, Apr. 21, 2018, pp. 1-13.

Choi, et al., "Grabity: A Wearable Haptic Interface for Simulating Weight and Grasping in Virtual Reality", In Proceedings of 30th Annual ACM Symposium on User Interface Software and Technology, Oct. 22, 2017, pp. 119-130.

Choi, et al., "Wolverine: A wearable haptic interface for grasping in virtual reality", In Proceedings of International Conference on Intelligent Robots and Systems (IROS), Oct. 9, 2016, 8 Pages.

Culbertson, et al., "Haptics: The present and future of artificial touch sensation", In Journal of Annual Review of Control, Robotics, and Autonomous Systems, vol. 1, Jan. 29, 2018, 25 Pages.

Daniel, et al., "Cairnform: A shape-changing ring chart notifying renewable energy availability in peripheral locations", In Proceedings of the Thirteenth International Conference on Tangible, Embedded, and Embodied Interaction, Mar. 17, 2019, pp. 275-286.

Fang, et al. "Wireality: Enabling Complex Tangible Geometries in Virtual Reality with Worn Multi-String Haptics", In Proceedings of the CHI Conference on Human Factors in Computing Systems, Apr. 25, 2020, pp. 1-10.

Fitzmaurice, et al., "Bricks: Laying the Foundations for Graspable User Interfaces", In Proceedings of the SIGCHI Conference on Human Factors in Computing Systems, May 1, 1995, pp. 1-8.

Freed, Adrian, "FastTouch", Retrieved From: https://github.com/adrianfreed/FastTouch, Aug. 16, 2019, 2 Pages.

Gonzalez-Franco, et al., "Model of Illusions and Virtual Reality", In Journal of Frontiers in psychology, Jun. 30, 2017, pp. 1-8.

Harrison, et al., "Providing Dynamically Changeable Physical Buttons on a Visual Display", In Proceedings of the Analog Dialogue, vol. 35, No. 4, Apr. 4, 2009, pp. 299-308.

Heo, et al., "PseudoBend: Producing haptic illusions of stretching, bending, and twisting using grain vibrations", In Proceedings of the 32nd Annual ACM Symposium on User Interface Software and Technology, Oct. 20, 2019, pp. 803-813.

Heo, et al., "Thor's hammer: An ungrounded force feedback device utilizing propeller-induced propulsive force", In Proceedings of the CHI Conference on Human Factors in Computing Systems, Apr. 21, 2018, pp. 1-11.

In, et al., "Jointless Structure and Under-Actuation Mechanism for Compact Hand Exoskeleton", In Proceedings of IEEE International Conference on Rehabilitation Robotics, Jun. 29, 2011, 6 Pages.

Kovacs, et al., "Haptic PIVOT: On-Demand Handhelds in VR", In Proceedings of the 33nd Annual ACM Symposium on User Interface Software and Technology, Oct. 20, 2020, pp. 1046-1059.

Koyanagi, et al., "Development of vr-stef system with force display glove system", In Proceedings of the international conference on Augmented tele-existence, vol. 6794, Dec. 5, 2005, pp. 91-97.

Lakatos, Dávid, "AMPHORM: form giving through gestural interaction to shape changing objects", In Doctoral dissertation, Massachusetts Institute of Technology, Jun. 2012, 76 Pages.

Lee, et al., "TORC: A Virtual Reality Controller for In-Hand High-Dexterity Finger Interaction", In Proceedings of CHI Conference on Human Factors in Computing Systems, May 4, 2019, pp. 1-13.

Leithinger, et al., "Shape displays: Spatial interaction with dynamic physical form", In Journal of IEEE computer graphics and applications vol. 35, Issue 5, Sep. 23, 2015, pp. 5-11.

Nam, et al., "Smart glove: hand master using magnetorheological fluid actuators", In Mechatronics, MEMS, and Smart Materials, Dec. 16, 2007.

Ou, et al., "aeroMorph—Heat-sealing Inflatable Shape-change Materials for Interaction Design", In Proceedings of the 29th Annual Symposium on User Interface Software and Technology, Oct. 16, 2016, pp. 121-132.

Sareen, et al., "Printflatables: Printing Human-Scale, Functional and Dynamic Inflatable Objects", InProceedings of the CHI Conference on Human Factors in Computing Systems, May 6, 2017, pp. 3669-3680.

Shigeyama, et al., "Transcalibur: weight moving VR controller for dynamic rendering of 2D shape using haptic shape illusion", In ACM SIGGRAPH 2018 Emerging Technologies, Aug. 12, 2018, 2 Pages.

Sinclair, et al., "CapstanCrunch: A Haptic VR Controller with User-supplied Force Feedback", In Proceedings of the 32nd Annual ACM Symposium on User Interface Software and Technology, Oct. 20, 2019, pp. 815-829.

Siu, et al., "shapeShift: 2d Spatial Manipulation and Self-Actuation of Tabletop Shape Displays for Tangible and Haptic Interaction", In Proceedings of the CHI Conference on Human Factors in Computing Systems, Apr. 21, 2018, 13 Pages.

Sun, et al., "PaCaPa: A handheld vr device for rendering size, shape, and stiffness of virtual objects in tool-based interactions", In Proceedings of the CHI Conference on Human Factors in Computing Systems, May 4, 2019, pp. 1-12.

Teng, et al., "PuPoP: Pop-up Prop on Palm for Virtual Reality", In Proceedings of the 31st Annual ACM Symposium on User Interface Software and Technology, Oct. 14, 2018, pp. 5-17.

Whitmire, et al., "Haptic Revolver: Touch, Shear, Texture, and Shape Rendering on a Reconfigurable Virtual Reality Controller", In Proceedings of the CHI Conference on Human Factors in Computing Systems, Apr. 21, 2018, pp. 1-12.

Yao, et al., "PneUI: pneumatically actuated soft composite materials for shape changing interface", In Proceedings of the 26th annual ACM symposium on User interface software and Technology, Oct. 8, 2013, pp. 13-22.

Yoshida, et al., "PoCoPo: Handheld Pin-based Shape Display for Haptic Rendering in Virtual Reality", In Proceedings of the CHI Conference on Human Factors in Computing Systems., Apr. 25, 2020, 13 Pages.

Zenner, et al., "Drag: on: A virtual reality controller providing haptic feedback based on drag and weight shif", In Proceedings of the CHI Conference on Human Factors in Computing Systems, May 4, 2019, pp. 1-12.

Zenner, et al., "Shifty: A Weight-Shifting Dynamic Passive Haptic Proxy to Enhance Object Perception in Virtual Reality", In Journal of IEEE Transactions on Visualization and Computer Graphics, vol. 23, Issue 4, Apr. 2017, 6 Pages.

"International Search Report and Written Opinion Issued in PCT Application No. PCT/US21/061046", dated Feb. 28, 2022, 17 Pages.

Strasnick, et al., "Applications of Switchable Permanent Magnetic Actuators in Shape Change and Tactile Display", Retrieved From: https://web.archive.org/web/20200210053847/http://shape.stanford.edu/research/switchableMagnets/, Feb. 10, 2020, 3 Pages.

(56) References Cited

OTHER PUBLICATIONS

Strasnick, et al., "ShiftIO", Retrieved From: https://web.archive.org/web/20200210150518/http://shape.stanford.edu/research/shiftIO/, Feb. 10, 2020, 2 Pages.

\* cited by examiner

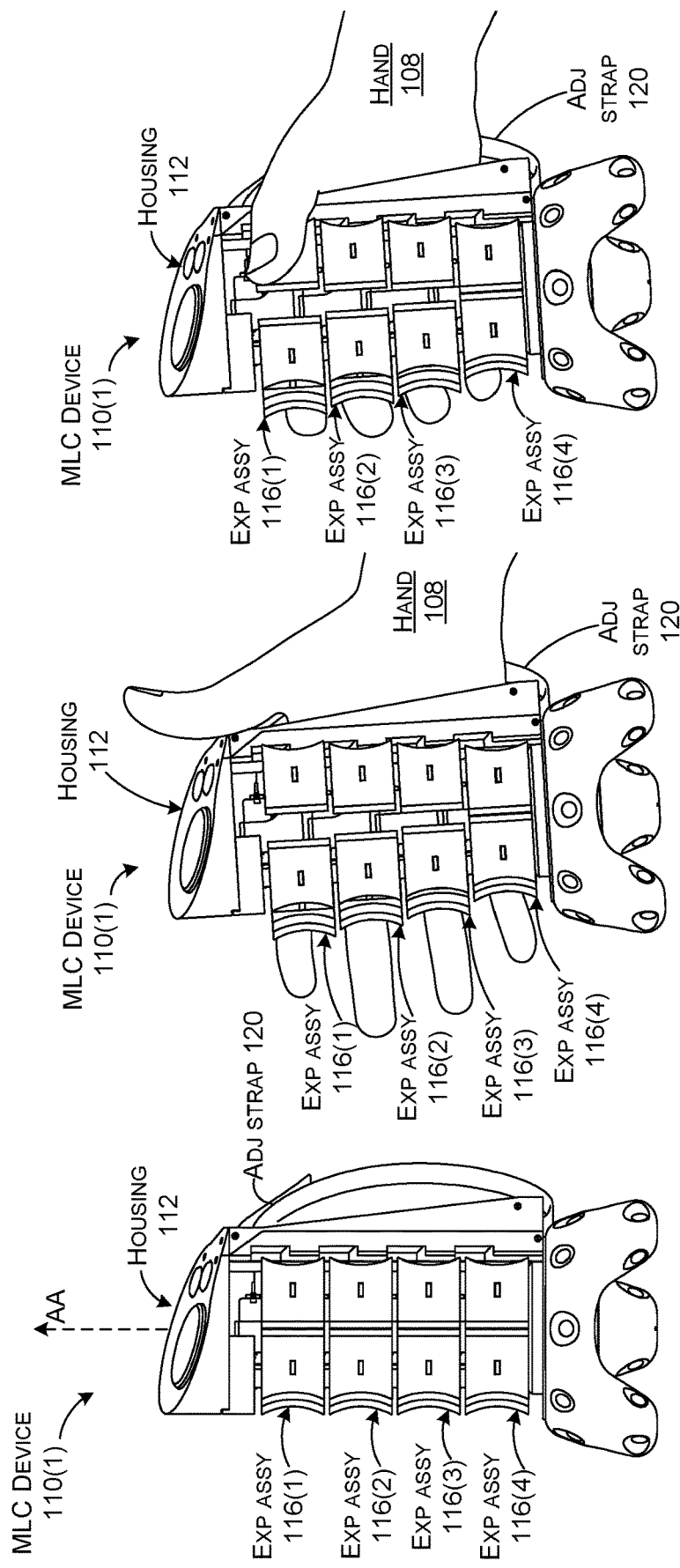

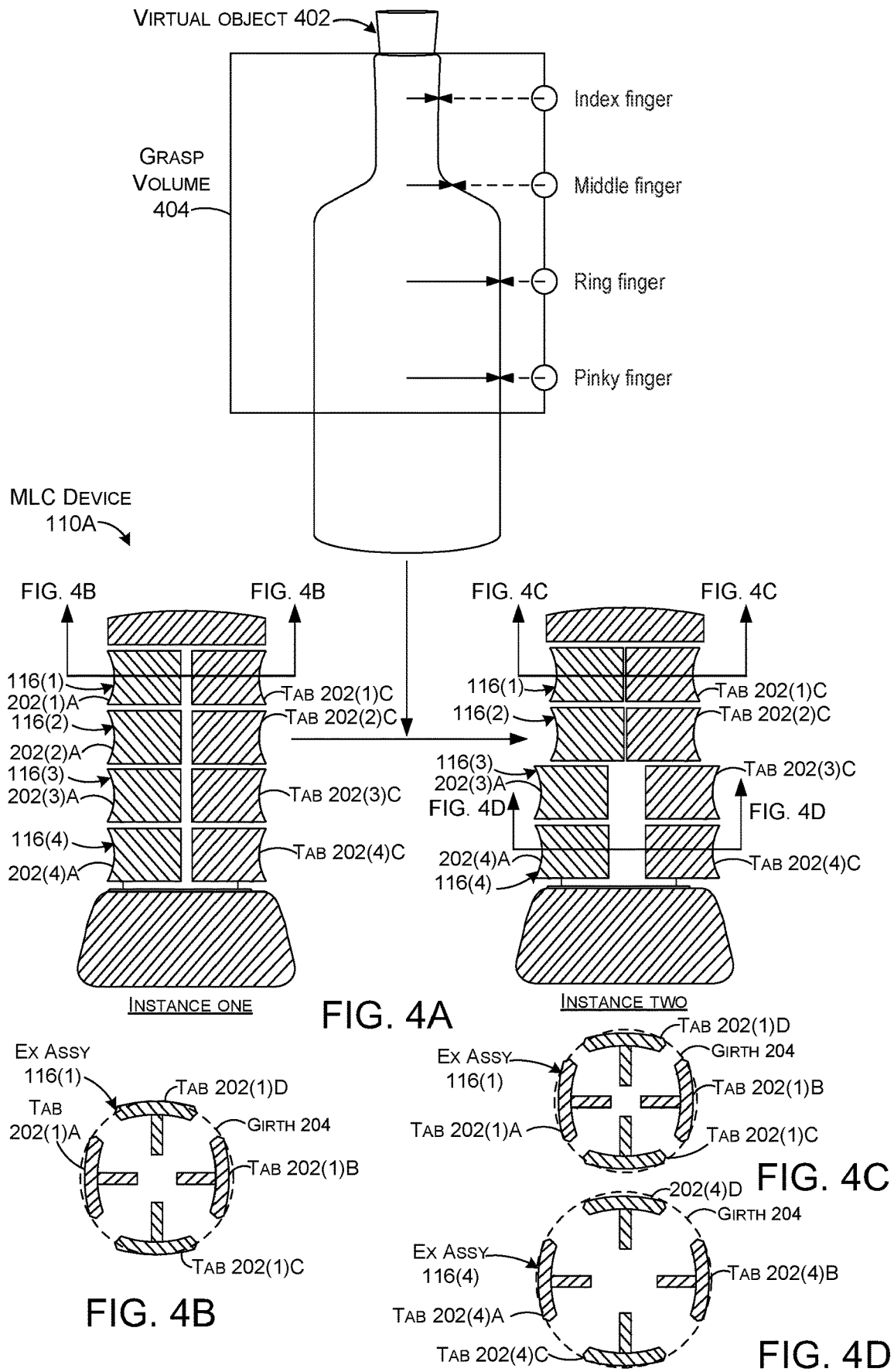

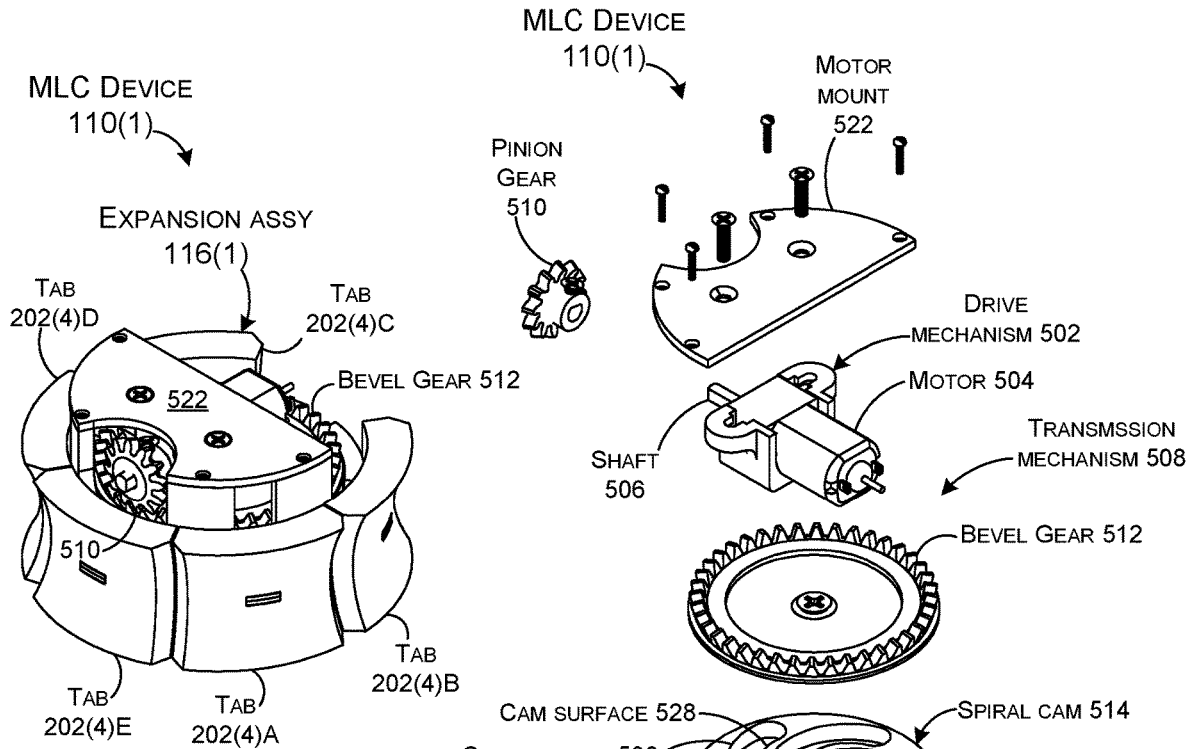
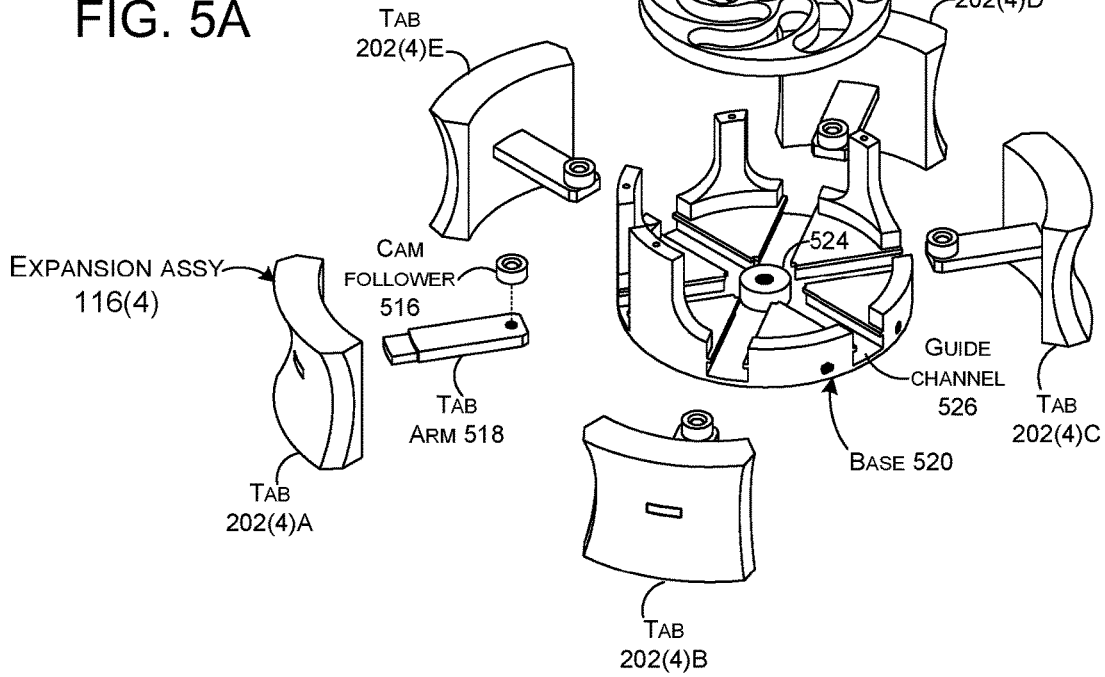
FIG. 5A
FIG. 5B

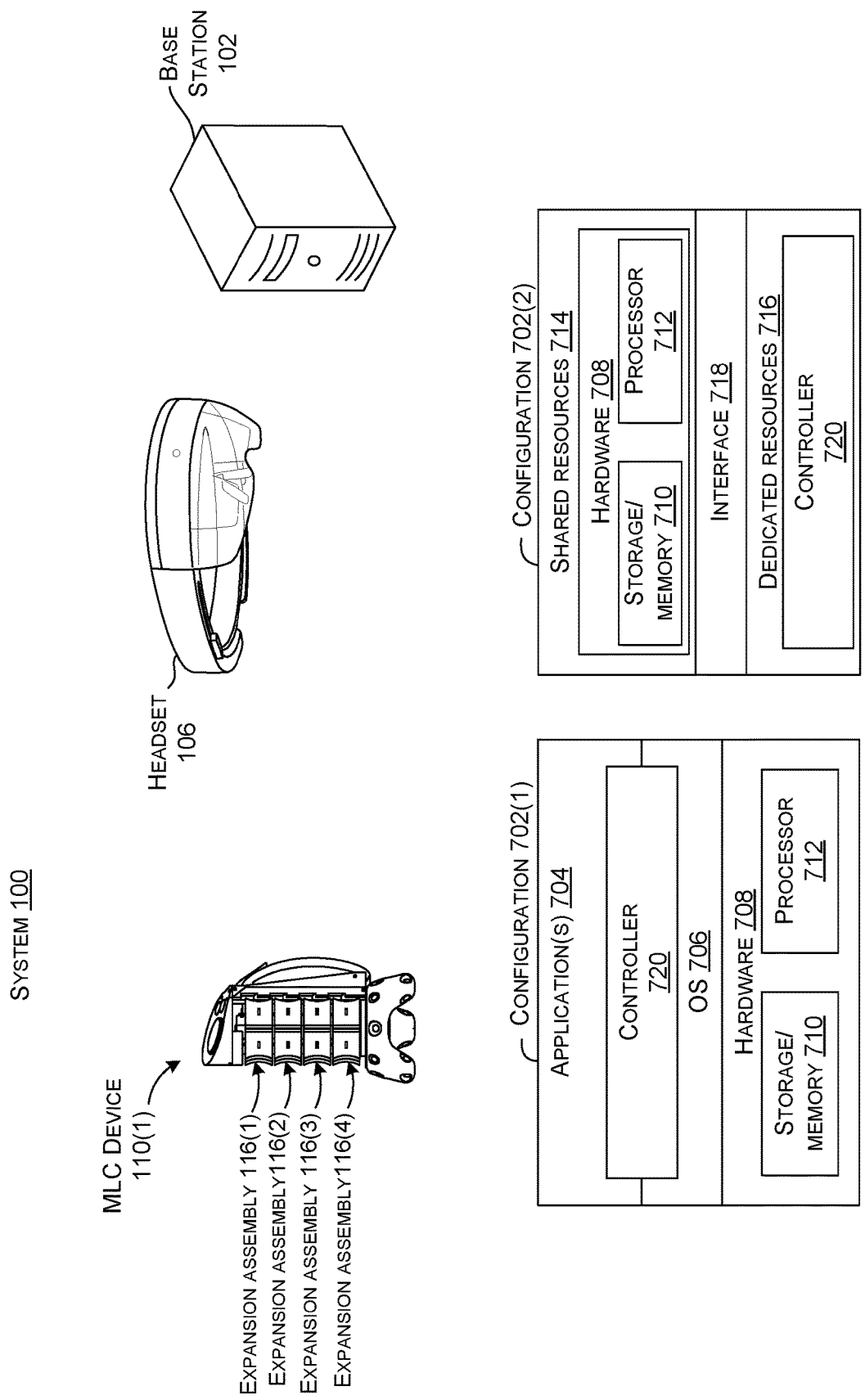

VIRTUAL SCENE 900

VIRTUAL SCENE 900

MULTILAYER CONTROLLER

BACKGROUND

In real life, humans tend to use their hands to interact with objects. They tend to reach out for such objects, touch, grasp, manipulate, and release them. Many virtual environments enable users to touch and grab objects of different shapes. However, whether the user picks up a sword, a large jug, or a ball, in most systems the user is physically holding the same fixed-shape and fixed-size controller.

Traditionally, there have been two main approaches to solve the issue of mismatch between virtual and physical shapes in virtual reality (VR). One solution is to use an encountered-type haptics paradigm, where different physical props are placed or robotically positioned to align with virtual content. This technique is sometimes combined with haptic retargeting to optimize the number or type of physical props needed.

The second approach aims to achieve more general haptic rendering by redesigning handheld controllers to change shape and apply forces directly to the hand. Hardware prototypes for simulating objects of different shapes and sizes are numerous. Instrumented solid-state controllers have also been able to simulate physical properties of held objects using wideband vibration, but their use is limited by the extent of haptic illusions they produce. Devices with moving parts often allow more versatile haptic rendering. For example, motors or brake mechanisms can allow users to grab objects of different sizes via palm-referenced, finger-actuated grasping. The entire hands and fingers can also be actuated with exoskeletons for whole-hand feedback. Some systems are externally- or body-mounted with mechanical links or tendons providing resistance to the fingers and hand. The present concepts address these and/or other issues.

BRIEF DESCRIPTION OF THE DRAWINGS

The accompanying drawings illustrate some implementations of the present concepts. Features of the illustrated implementations can be more readily understood by reference to the following descriptions in conjunction with the accompanying drawings. Like reference numbers in the various drawings are used where feasible to indicate like elements. In some cases, parentheticals and/or suffixes are utilized after a reference number to distinguish like elements. Use of the reference number without the associated parenthetical is generic to the element. The accompanying drawings are not necessarily drawn to scale. In the figures, the left-most digit of a reference number identifies the figure in which the reference number first appears. The use of similar reference numbers in different instances in the description and the figures may indicate similar or identical items.

FIGS. 1A-1D and 7 illustrate example systems in which graspable controller concepts can be employed, consistent with some implementations of the present concepts.

FIGS. 5A, 9A, 9B, and 10A-10C illustrate perspective views of example graspable controllers, consistent with some implementations of the present concepts.

FIG. 5B illustrates an exploded perspective view of an example graspable controller, consistent with some implementations of the present concepts.

FIGS. 3A, 3B, and 4A-4D illustrate sectional views of example graspable controllers, consistent with some implementations of the present concepts.

DETAILED DESCRIPTION

Figure 1A:
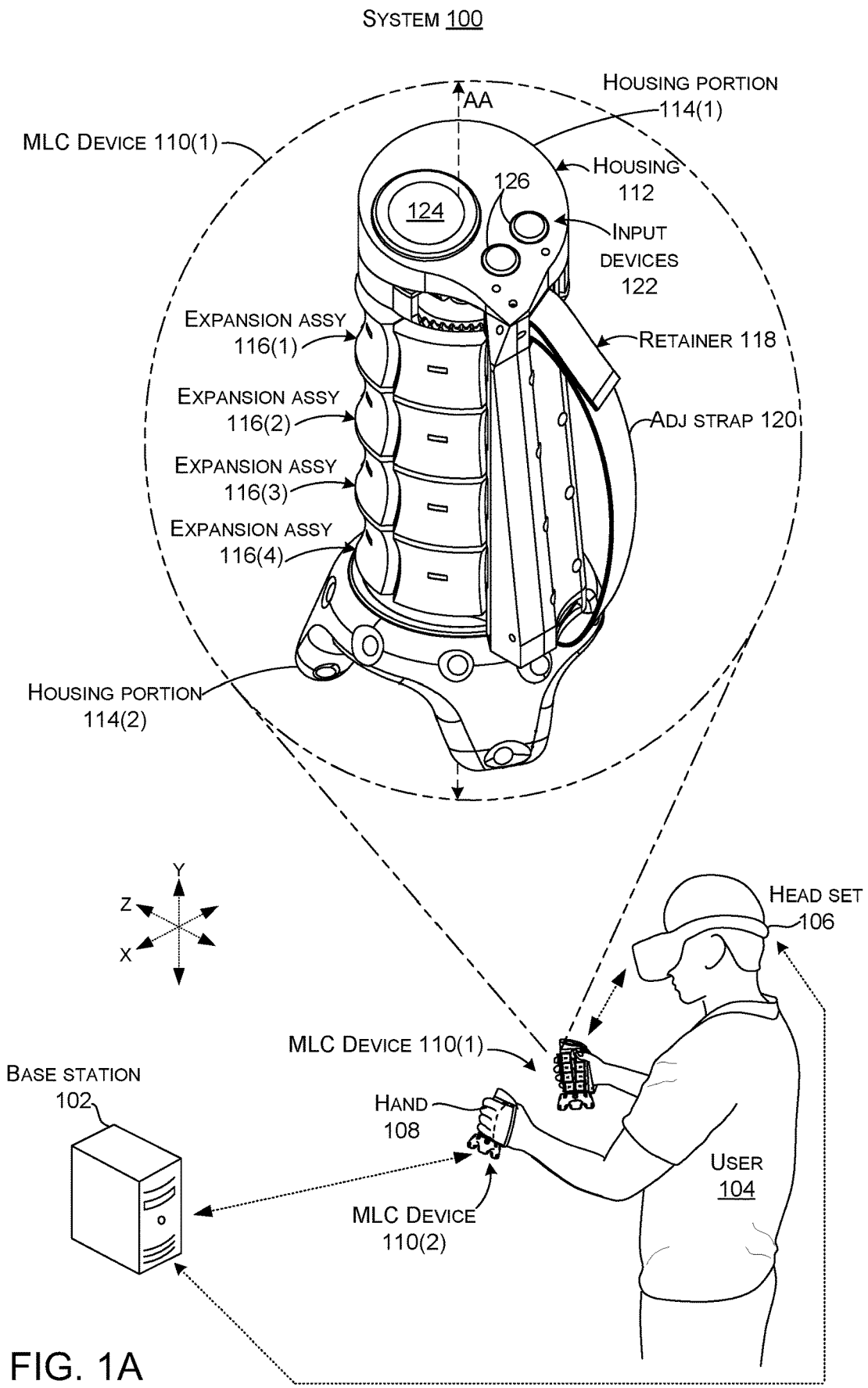

The present concepts relate to devices that include graspable controllers that can be held by a user in various scenarios including augmented reality (AR) and virtual reality (VR) scenarios, among others. The graspable controller can allow the user to tactilely engage virtual objects with their hand(s). The graspable controller can include a stack of multiple independently controllable layers that can simulate different sized and/or shaped objects. The layers can be sized to align with individual fingers of the grasping hand. Each layer can be increased or decreased in size to simulate the profile of various virtual objects.

Previous systems for grasping in VR tend to follow an "outside-in" approach, with actuators and device mechanisms externally-mounted outside the grasp volume. This, however, does not leverage the fact that in many VR scenarios users are already grasping a controller.

The present concepts can relate to a stacked controller as a change in this paradigm towards an "inside-out" approach. Toward this end, some of the present implementations can integrate shape output into the controller handle itself. These concepts provide the first hand-scale shape display capable of rendering 360-degree surfaces which are graspable by the user's whole hand. The unique cylindrical arrangement of some implementations can enable rendering the object's shape over most or all of the palm and fingers. This can be contrast to most prior work, which focuses on fingertips alone. Some of the implementations direct the haptic rendering to four fingers, where the thumb is in opposition. This configuration can allow the system to be designed using only four actuators, making the controller lighter, simpler, and more robust. These and other concepts are described below by way of example.

FIGS. 1A-1D collectively illustrate a system 100, consistent with some implementations of the present concepts. For purposes of explanation, the system 100 is explained relative to a virtual reality use case scenario, but can alternatively or additionally be implemented in other use case scenarios. The system 100 can include a base station 102. In some configurations, the base station 102 can include hardware and/or software for generating and executing a virtual reality world, including receiving and processing inputs from a user 104, and generating and outputting feedback to the user 104. The base station 102 may be any computing device, including a personal computer (PC), server, gaming console, smartphone, tablet, notebook, automobile, simulator, etc.

In some implementations, the system 100 can include a headset 106. The headset 106 may be, for example, a head-mounted display (HMD) that can receive information relating to the virtual reality, the real world (e.g., the scene), and/or the user. In some implementations, the headset 106 may include one or more sensors (not shown in FIG. 1A) for providing inputs to the base station 102 and/or the headset 106. The sensors may include, for example, accelerometers, gyroscopes, cameras, microphones, etc. The headset 106, therefore, may be capable of detecting objects in the user's surrounding, the position of the user's head, the direction the user's head is facing, whether the user's eyes are opened or closed, which direction the user's eyes are looking, a location of user body parts, such as hand 108, etc. The headset can have capabilities to present data, such as audio and/or visual data, including virtual objects to the user 104.

The system 100 may further include a multilayer controller device (e.g., 'MLC device') 110. In this example, the user is wearing an MLC device 110 on each hand. Other implementations may employ a single multilayer controller device 110 or more than two multilayer controller devices 110.

The device 110 can include a housing 112. In this illustration, upper and lower housing portions 114(1) and 114(2) are visible. Also, in this case, the housing 112 can be generally elongate and extend along or between an axis 'AA.' Independently-controllable expansion assemblies 116 can be positioned relative to the housing 112. In this case, the expansion assemblies can be interposed between the housing portions 114, such as by being positioned along the axis AA, or at an alternative orientation. In this example, there are four expansion assemblies 116, though other numbers can be employed. The user can grip the MLC device 110 so that the fingers align with individual expansion assemblies 116. For instance, the user's index finger can align with expansion assembly 116(1), the user's middle finger can align with expansion assembly 116(2), the user's ring finger can align with expansion assembly 116(3), and the user's pinky finger can align with expansion assembly 116(4). The thumb may wrap around the MLC device and partially overlap one of the fingers, such as the index finger, depending on user preference. In this case, a retainer 118 in the form of an adjustable strap 120 can retain the MLC device on the user's hand even when they are not gripping it. The MLC device 110 can be donned by the user by tightening the adjustable strap 120 around their hand. The housing 112 can be ergonomically curved to afford rough alignment with the user's knuckles. By securing the device to their hand in this way, the user is free to grasp and release rendered shapes.

Individual expansion assemblies 116 can have an adjustable girth that can be expanded and contracted through a range of dimensions. The adjustable girth aspect is illustrated relative to FIGS. 2A-2C. Girths of the individual expansion assemblies can collectively approximate a size and/or shape (e.g., girth) of a virtual object. This aspect will be described below relative to FIGS. 4A-4D.

In this example, input devices 122 are positioned on the housing 112. For instance, a trackpad 124, and two input buttons 126 are employed on housing portion 114(1) and 6-DOF sensors are positioned in housing portion 114(2) (but are obstructed from view). The 6-DOF sensors are described in more detail below relative to FIG. 8. Other configurations are contemplated.

Figure 2A:
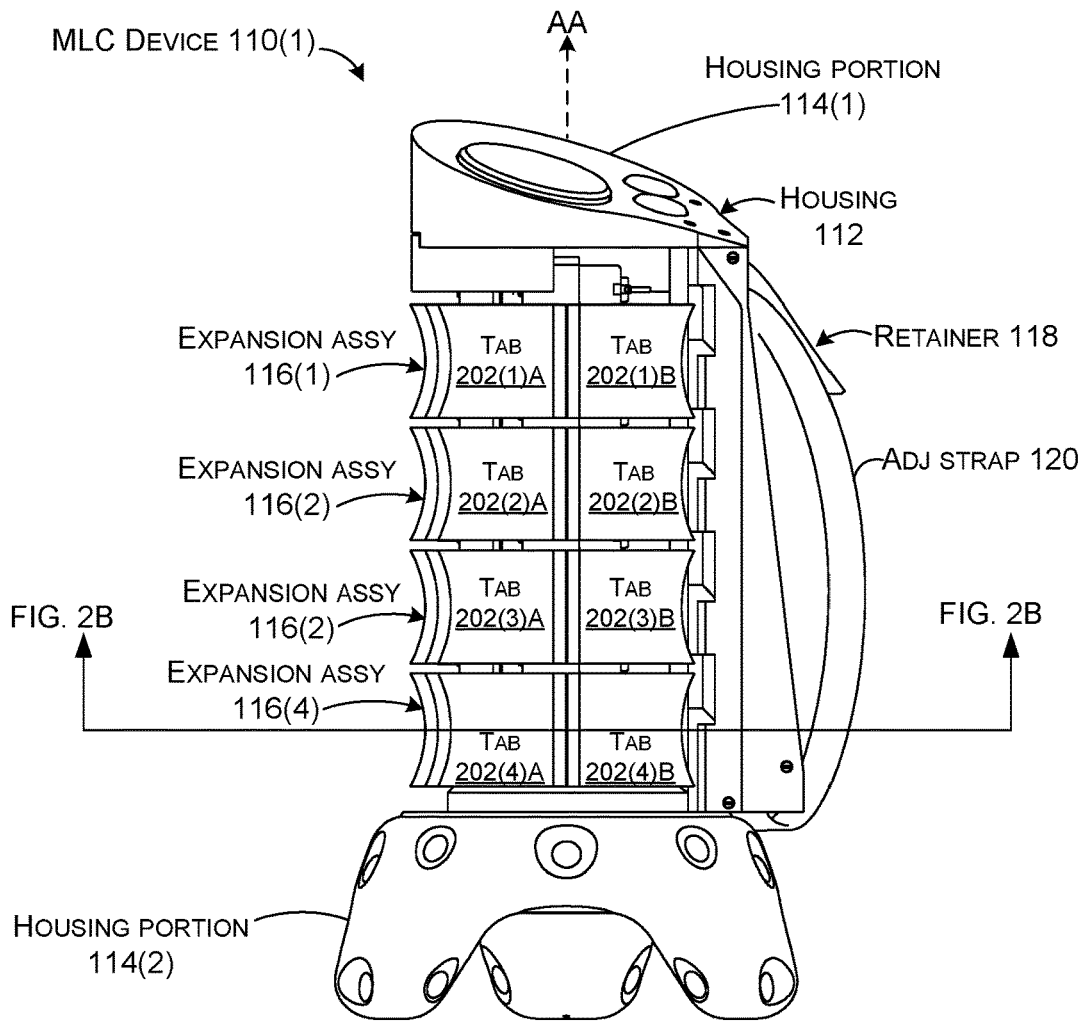
FIGS. 2A, 2B, 6A-6C, 8, 11A, and 11B illustrate elevational views of example graspable controllers, consistent with some implementations of the present concepts.
Figure 2B:
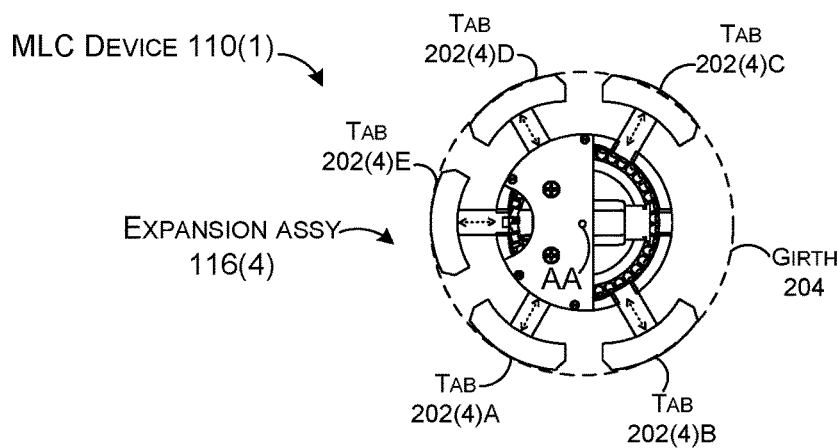

FIGS. 2A and 2B collectively show MLC device 110(1) and show details about the expansion assemblies 116. Individual expansion assemblies can include multiple tabs or wedges 202. This implementation employs five tabs 202 per expansion assembly 116. Individual tabs 202 can be moved toward and away from a center of the expansion assembly to affect a girth 204 of the expansion assembly. The girth 204 can be a circumference or other shape, either a regular shape or an irregular shape.

In some implementations, such as this one, the tabs 202 of an individual expansion assembly 116 are synchronized (e.g., move in or out by the same amount at the same time). In other implementations, individual tabs can be controlled individually to produce more varied shapes including both regular shapes and/or irregular shapes.

Figure 3A:
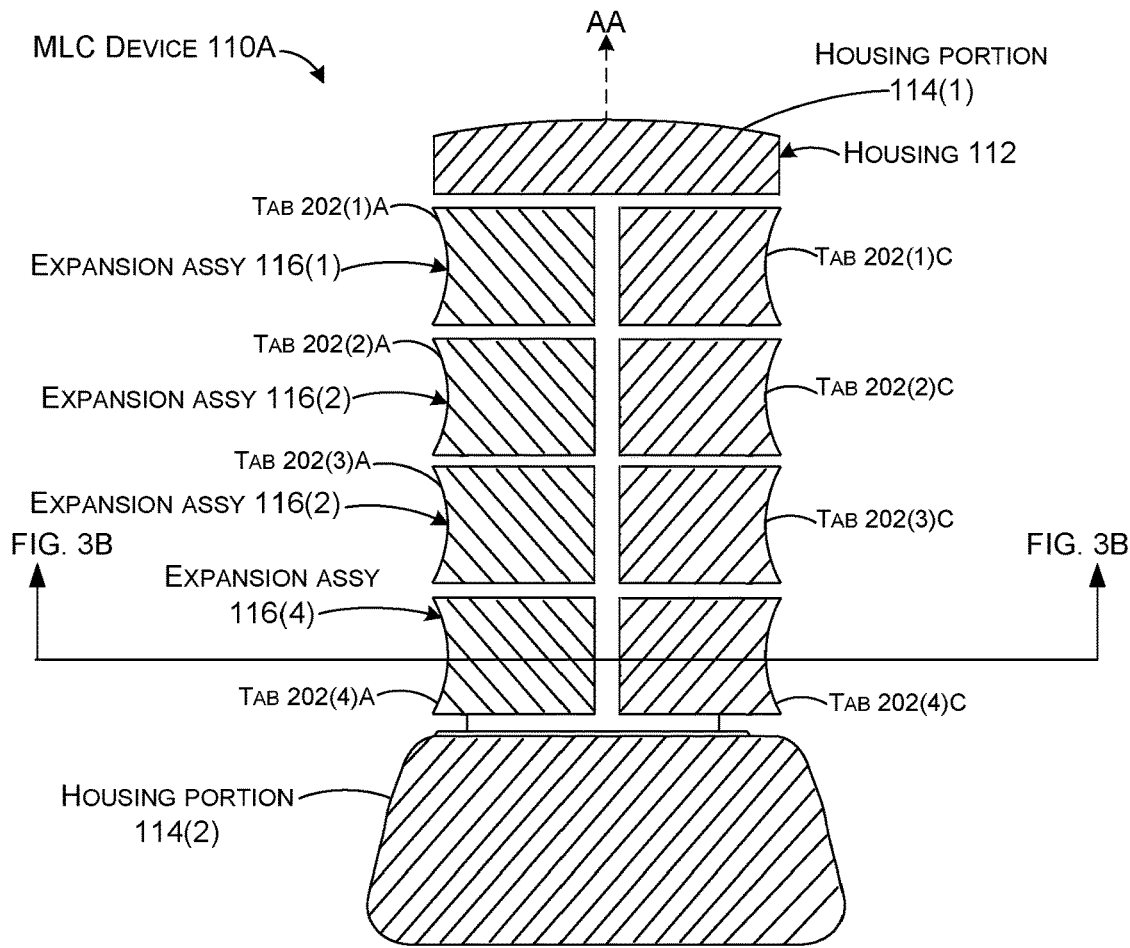
Figure 3B:
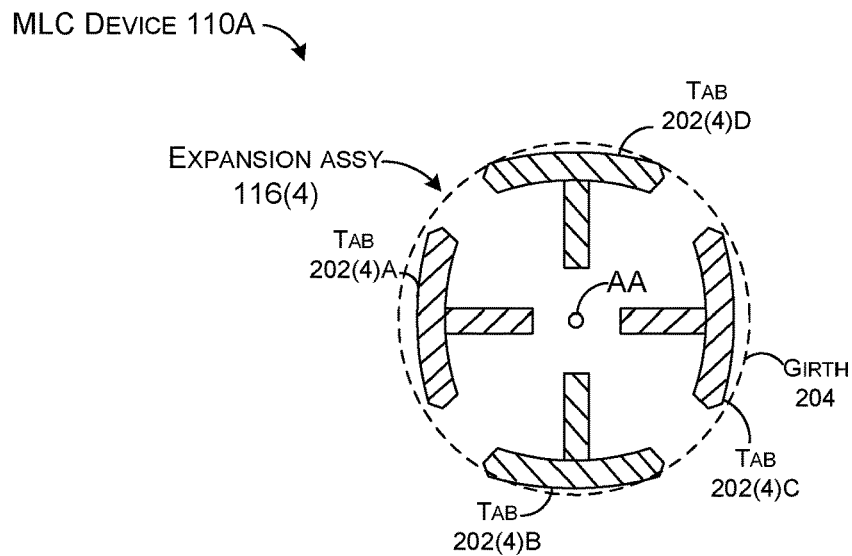

FIGS. 3A and 3B collectively show another MLC device 110A. and show details about the expansion assemblies 116. This implementation employs four tabs 202 per expansion assembly 116. Individual tabs 202 can be moved toward and away from a center of the expansion assembly to affect a girth 204 of the expansion assembly. In this case, the center can be co-incident with line AA. Thus, line AA can define a focus of the tabs 202.

FIGS. 4A-4D collectively show a use case scenario involving MLC device 110A. Instance One shows the MLC device in a neutral position with each of the expansion assemblies 116 set at an intermediate girth, which is shown in FIG. 4B. At this point, information relating to a virtual object 402 is received at the MLC device 110A. In this case, the virtual object 402 is a bottle. Specifically, information relating to a grasp volume 404 of the virtual object 402 is received at the MLC device. The grasp volume 404 can relate to a position at which the user's hand is predicted to engage the virtual object as the user reaches for the virtual object 402. The grasp volume 404 can include various dimensions at that position. In this case, the dimensions are reflected by a radius of the virtual object 402 where the user's index finger, middle finger, ring finger, and pinky finger would engage in the grasp volume 404.

Instance Two shows the position of tabs 202 of individual expansion assemblies 116 adjusted to reflect the expected dimensions of the virtual object for each of the fingers. In this example, tabs 202(1) and 202(2) of expansion assemblies 116(1) and 116(2) are pulled inwardly to decrease the girth 204 as shown in FIG. 4C. In contrast, tabs 202(3) and 202(4) of expansion assemblies 116(3) and 116(4) are pushed outwardly to increase the girth 204 as shown in FIG. 4D. Thus, the girths of expansion assemblies 116(1) and 116(2) engaged by the index finger and middle finger are relatively small and simulate the neck of the bottle. In contrast, the girths of expansion assemblies 116(3) and 116(4) engaged by the ring finger and pinky finger are relatively large and simulate the body of the bottle.

Thus, MLC device 110 can function as a shape-changing controller that can render radially-symmetric surfaces and/or asymmetric surfaces to enable whole-hand encountered-type grasping in VR.

FIGS. 5A and 5B collectively show details of example expansion assembly 116(1). In this implementation, the expansion assembly 116(1) can include or be coupled to a drive mechanism (e.g., actuator) 502. In this case, the drive mechanism 502 is manifest as an electric motor 504 that turns a shaft 506. In some other implementations, the drive mechanism 502 can be manifest as hydraulic actuators. Other implementations can employ shape memory Nitinol metal, such as the Muscle Wire brand, as the drive mechanism 502. Other drive mechanisms are contemplated.

In the illustrated configuration, the shaft 506 can function as part of a transmission mechanism 508. The transmission mechanism 508 can function to couple the drive mechanism 502 to the tabs 202. In this case, the transmission mechanism 508 can include a pinion gear 510, a bevel gear 512, a spiral or radial cam 514, cam followers 516, and tab arms 518. The expansion assembly 116(1) can also include a base 520 and a motor mount 522. The base 520 can include a hub 524 and guide channels 526. In this case, the hub 524 can function as a focus around which the tabs 202 are arranged. From another perspective the tabs 202 can be radially arranged around the hub 524.

The motor 504 can be secured to the motor mount 522, such as with fasteners (shown but not specifically designated). In turn, the motor mount 522 can be secured to the base 520. The pinion gear 510 can be positioned on the motor's shaft 506. The pinion gear 510 can mesh with bevel gear 512. The bevel gear 512 and the spiral cam 514 can be secured together and positioned on the hub 524. The spiral cam 514 can define a pair of opposing cam surfaces 528 and 530 for each tab 202(4). (Only one pair of cam surfaces 528 and 530 are labelled on the drawing page to avoid clutter). The cam followers 516 can reside between the cam surfaces 528 and 530. The cam surfaces can also be secured to the tab arms 518. The tab arms 518 can reside in the guide channels 526.

When the motor 504 turns the spiral cam 514 counter-clockwise, the cam surfaces 528 force (e.g., push) the cam followers 516 away from the hub 524. In this case, the cam followers 516 are manifest as ball bearings that reside between the cam surfaces 528 and 530 and are retained in the tab arms 518. Hence outward movement of the cam followers creates outward movement of the tab arms 518 and the tabs 202(4) away from the hub 524. This increases the distance between the hub 524 and the tabs 202(4) and hence the girth of the expansion assembly 116(4). When the motor 504 turns the spiral cam 514 clockwise, the cam surfaces 530 force (e.g., pull) the cam followers 516 (and hence the tab arms 518 and tabs 202(4)) toward the hub 524. This decreases the girth of the expansion assembly 116(4). In some implementations, at this inward most position (e.g., minimum girth) the tabs 202 can form a generally continuous ring at the girth. In other implementations, spaces are maintained between the tabs 202 at all positions.

Some implementations can employ indents on each tab 202 to ensure gripping forces are centrally applied to each tab arm 518. Additionally, the exterior edge of each tab 202 can be made with a concavity along the circumference for easy finger positioning and to prevent any pinching of the fingers during shape-change. While not specifically shown, a flexible material, such as an elastic fabric can be positioned over and/or secured to the tabs 202 from the top portion of the housing (114(1), FIG. 1A) to the bottom portion 114(2) of the housing 112 to hide gaps between the tabs 202 at the larger girths.

In some cases, the cam surfaces 528 and 530 relating to an individual tab 202 can have essentially identical profiles. Such a configuration can cause the same rate of expansion and contraction of the girth. Other configurations can have different cam surface profiles relating to individual tabs. For instance, cam surfaces 528 can have a profile selected to initially cause a faster rate of outward movement of the tabs and then the rate slows as the tabs approach their outward most position. In contrast, cam surfaces 530 could be selected to have a uniform rate of pulling the tabs inwardly toward the hubs. Other configurations are contemplated. Alternatively or additionally, cam surfaces 528 and/or 530 relating to different tabs 202 can have different profiles. For instance, cam surfaces 528 and/or 530 relating to tab 202(4)E can have different profiles than cam surfaces 528 and/or 530 relating to tab 202(4)D.

From one perspective, MLC device 110 can include a unique electromechanical design for a low-cost girth changing mechanism, useful for shape output and touch/pressure sensing. Towards this goal, MLC device 110(1) can provide multiple stacked expansion assemblies 116 that can extrude in 360-degrees about a cylindrical rendering region—as opposed to traditional planar displays—which aims to support encountered-type grasping in VR. While rendered surfaces can be radially symmetric, the reduced degrees of freedom dramatically reduce the number of employed motors for a given rendering volume. An alternative configuration capable of generating non-radial shapes is described below relative to FIGS. 6A-6C.

Further, MLC device 110 can rapidly render a diverse set of distinguishable shapes, can be easily and comfortably manipulated by the user, and can support user input through physical interaction with the rendered shape. In some implementations, rendering time of about 0.1 seconds from minimum girth to maximum girth are readily achievable and allow the expansion assemblies 116 to swiftly change size as the user releases a virtual object and reaches to grab another. Beyond quick rendering times, the MLC device can withstand human-scale grasping forces, while maintaining surface back drivability to (potentially) maximize interactivity.

The MLC device 110(1) can sense user interaction with the rendered surfaces, in the form of touch and/or gripping force sensing. This aspect is described in more detail below relative to FIG. 7. Further, the MLC device can keep fingers free from support hardware so rendered object surfaces can be grasped naturally. The MLC device can maintain a compact, "graspable" form factor, meaning all actuation and shape-change mechanisms can fit within a small enough radius that can be enclosed by the hand (e.g., an "inside-out" construction). The illustrated implementation employing a single motor 504 per expansion assembly 116 can limit mechanical complexity and number of drive mechanisms, reducing required maintenance, cost and weight. Other implementations can employ more drive mechanisms per expansion assembly 116.

The components described above can be manufactured from various materials, such as polymers and/or metals, utilizing various techniques, such as machining, molding, additive manufacturing, etc. The ball bearings and fasteners can be obtained from commercial sources. The motor 504 is described in more detail below relative to FIG. 8.

Figure 6A:
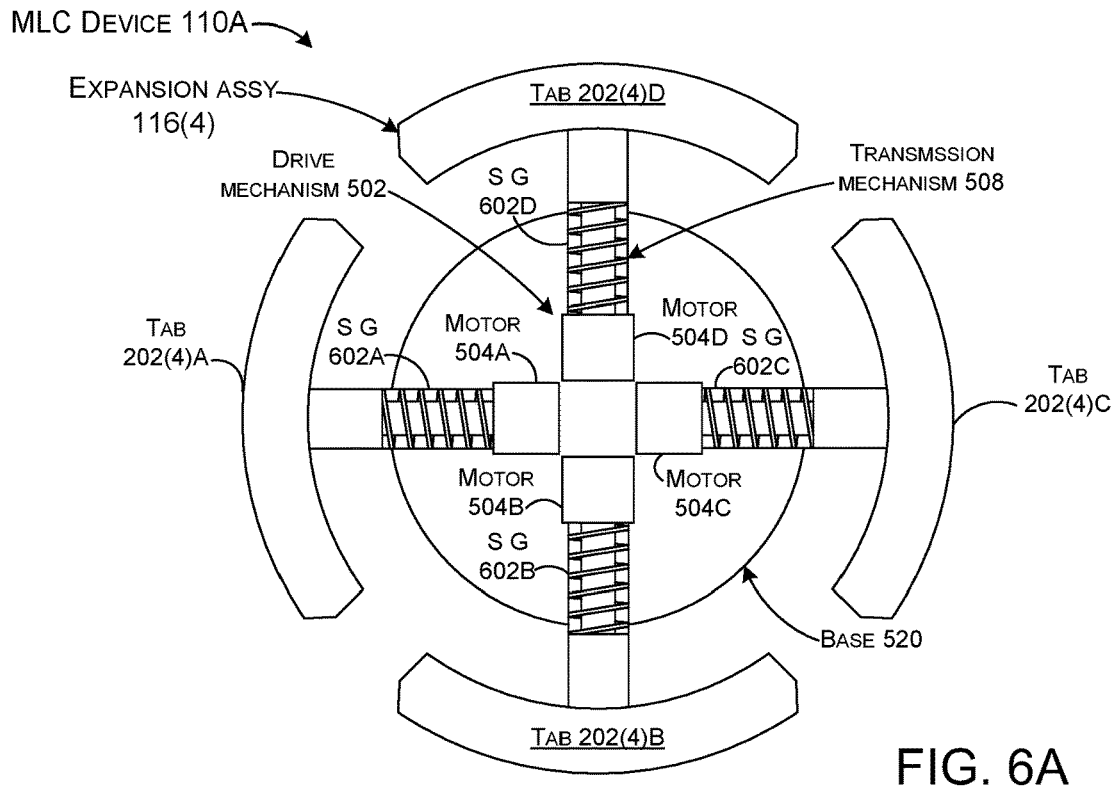
Figure 6B:
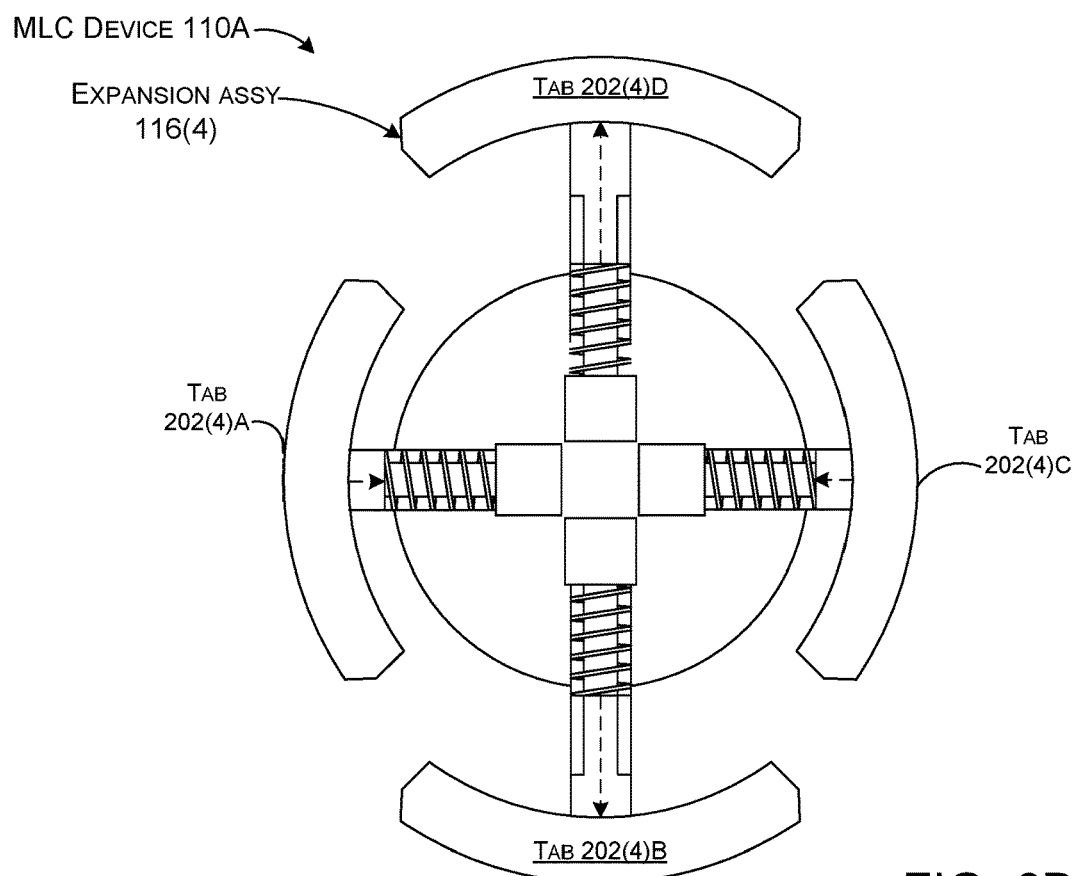
Figure 6C:
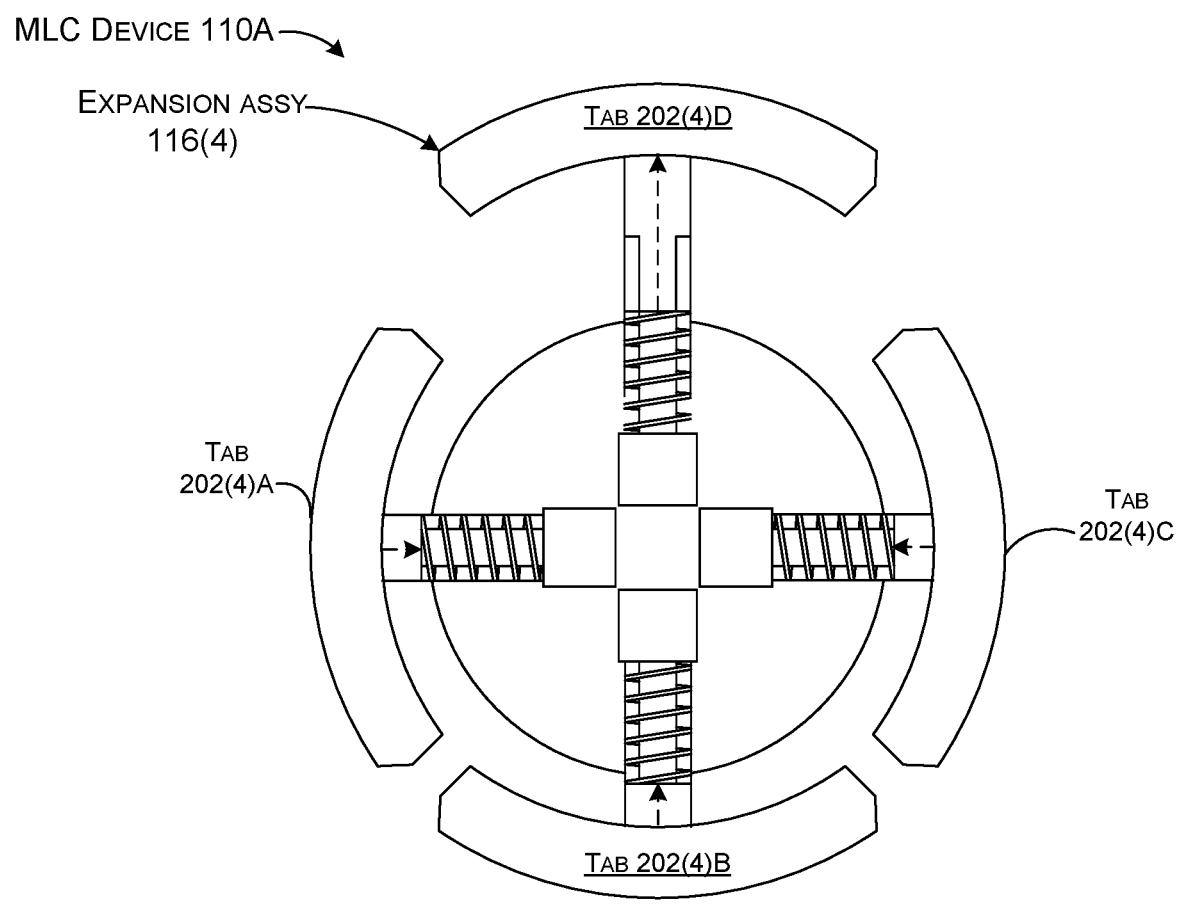

FIGS. 6A-6C relate to MLC device 110A introduced above relative to FIGS. 3A and 3B. FIGS. 6A and 6B show an individual expansion assembly 116(4). In this case, individual tabs 202(4) are associated with a dedicated motor 504. In this implementation, the transmission mechanism 508 entails a screw gear 602 that couples the motor to the respective tab 202(4). This configuration can allow the tabs 202(4) to collectively generate different shaped girths as well as different sized girths.

FIG. 6B shows a scenario where tabs 202(4)D and 202(4)B have been moved outwardly, while tabs 202(4)A and 202(4)C have been moved inwardly. This configuration can create an elliptical shaped girth. In some cases, independently controllable tabs can create irregularly shaped girths for the expansion assembly 116(4).

FIG. 6C shows a follow-up scenario where tab 202(4)B has been moved inwardly to decrease the girth and create an oblong shape. Other mechanisms for independently controlling the tabs are contemplated.

FIG. 7 shows further details of system 100, consistent with some implementations of the present concepts. The system 100 may include one or more MLC devices 110, headset 106, base station 102, and/or other devices, such as personal computers, desktop computers, notebook computers, cell phones, smart phones, personal digital assistants, pad type computers, mobile computers, wearable devices, cameras, appliances, smart devices, IoT devices, vehicles, etc., and/or any of a myriad of ever-evolving or yet-to-be-developed types of computing devices. As mentioned above, any of these devices can operate in a free-standing manner to achieve a given functionality or can operate cooperatively with other devices to achieve the functionality.

FIG. 7 shows two example device configurations 702 that can be employed by MLC device 110, headset 106, base station 102, and/or other devices. Individual devices, such as MLC device 110 can employ either of configurations 702(1) or 702(2), or an alternate configuration. (Due to space constraints on the drawing page, one instance of each device configuration is illustrated rather than illustrating the device configurations relative to each device). Briefly, device configuration 702(1) represents an operating system (OS) centric configuration. Device configuration 702(2) represents a system on a chip (SOC) configuration. Device configuration 702(1) is organized into one or more applications 704, operating system 706, and hardware 708. The hardware 708 can include storage/memory 710 and a processor 712, among others. Other hardware 708, such as expansion assemblies 116, drive mechanisms, and transmission mechanisms are described in detail above and are not reintroduced here. Device configuration 702(2) is organized into shared resources 714, dedicated resources 716, and an interface 718 therebetween.

These configurations can also include a controller 720. In some cases, the controller 720 can be manifest as software that is stored on storage/memory 710 and executed by the processor 712. In other cases, the controller 720 may be a dedicated hardware or firmware controller, such as a microcontroller. The controller can receive information relating to a scenario, such as a virtual reality scenario, an augmented reality scenario, a mixed reality scenario, etc. The information can include information about the properties of virtual objects, such as the virtual object's 6-degree of freedom (6-DOF) (e.g., x, y, z coordinates plus roll, pitch, and yaw) and/or other information such as various location, velocity, acceleration, mass, weight, dimensions and/or texture, among other information.

The controller 720 can also receive information about a user's body part, such as a finger, arm, or leg, among others. For instance, the controller could receive information about the user's hand from an outwardly facing camera on the headset 106. This information can include 6-DOF information (e.g., x, y, z coordinates plus roll, pitch, and yaw) and/or other information, such as, posture, velocity, acceleration, etc. The controller 720 can also receive some of this information from the MLC device 110 positioned in the user's hand. For instance, the MLC device can include a commercially available tracker, such as a Vive tracker, or similar device. The tracker can be mounted on the housing (112, FIG. 1A) to enable 6DOF tracking. The controller 720 can make predictions about interactions between the hand and the virtual objects based at least in part upon this information (e.g., when and where will the virtual object and the hand (e.g., the MLC device) intersect.

The controller 720 can then, based upon the predictions, control individual expansion assemblies 116 at the appropriate time when the user's hand 'engages' the virtual object. The controller 720 can control the individual expansion assemblies to simulate the grasp volume of the virtual object as explained above relative to FIGS. 4A-4D. In this way, the controller 720 can cause the MLC device 110 to simulate the virtual object with an approximately equivalent physical object (e.g., the expansion assemblies 116 engaged by the user's fingers). The controller 720 can accomplish the simulation by expanding or contracting the girths of the individual expansion assemblies 116. The controller 720 can control the girths of the individual expansion assemblies 116 to collectively approximate a size and/or shape (e.g., girth) of the virtual object. In this way, the expansion assemblies 116 can function as output devices to convey information about the environment to the user.

The hardware 708 can also include various output devices, such as microphones, buzzers, voice coil actuators (VCAs), and/or heaters/coolers, among others. The hardware 708 can also include various input devices (122, introduced above relative to FIG. 1A), such as pressure sensors, force sensors, such as strain gauges, capacitive touch sensor electrodes and/or user activatable switches (e.g., triggers), among others.

In some cases, the expansion assemblies 116 can also function as input devices. For instance, a current profile of the motor(s) 504 can indicate an amount of inward pressure (e.g., squeeze) the user is exerting on the expansion assembly. Briefly, motors draw more current when they are experiencing an opposing (e.g., squeezing) force imparted by the user. The motor current can be a function of the user's grasp force as well as the friction (linear and non-linear) friction in the system. The friction forces tend to be consistent and thus increased current levels can be attributed to user actions. The current from the motor can be mapped to a table of corresponding squeezing forces. This can allow the expansion assembly 116 to function as an output device that exerts a force on the user's fingers as the girth is expanded. Simultaneously, the expansion assembly can function as an input device that can capture the user's grip force on the expansion assembly. Stated another way, the expansion assemblies 116 can 'sense' user input without employing finger force sensors. For instance, squeezing force can be sensed from the current profile of the drive mechanism driving the expansion assemblies.

Thus, system 100 can have two types of input sensing. Capacitive sensing can detect whether the user is grasping the device, guiding the timing of shape-change when the user's hand is open. By measuring the motor's current through each expansion assembly, the system can generate estimates of the pressure applied by each finger. This signal can be used both as a safety measure, preventing the motors from sustaining too much current, and as a trigger for deformation behavior of virtual objects, such as breaking or crushing.

As mentioned, input sensors, such as capacitive sensing can be used to detect release of objects. Alternatively or additionally, sensing and actuators can create a closed loop for force control that could allow users to squeeze a virtual object or even perceive the compliance.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

Note that various conductors (shown but not designated) can be employed to communicatively couple various elements and/or to power various elements. For instance, universal serial bus (USB) conductors can be employed. Alternatively, some elements of the MLC device 110 could employ wireless technologies, such as Bluetooth™ and/or various Wi-Fi technologies, among others, to communicate within the MLC device (e.g., controller 720 and input devices 122) and/or with other devices (e.g., base station 102 and headset 106). The MLC device 110 can also include a battery (shown but not designated) and/or be tethered to another device to receive power. The tethering could also communicatively couple the device with other devices, rather than employing wireless technologies.

The term "device," "computer," or "computing device" as used herein can mean any type of device that has some amount of processing capability and/or storage capability. Processing capability can be provided by one or more processors that can execute data in the form of computer-readable instructions to provide a functionality. Data, such as computer-readable instructions and/or user-related data, can be stored on storage, such as storage that can be internal or external to the device. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

As mentioned above, device configuration 702(2) can be thought of as a system on a chip (SOC) type design. In such a case, functionality provided by the device can be integrated on a single SOC or multiple coupled SOCs. One or more processors 712 can be configured to coordinate with shared resources 714, such as storage/memory 710, etc., and/or one or more dedicated resources 716, such as hardware blocks configured to perform certain specific functionality. Thus, the term "processor" as used herein can also refer to central processing units (CPUs), graphical processing units (GPUs), field programable gate arrays (FPGAs), controllers, microcontrollers, processor cores, and/or other types of processing devices.

Figure 8:
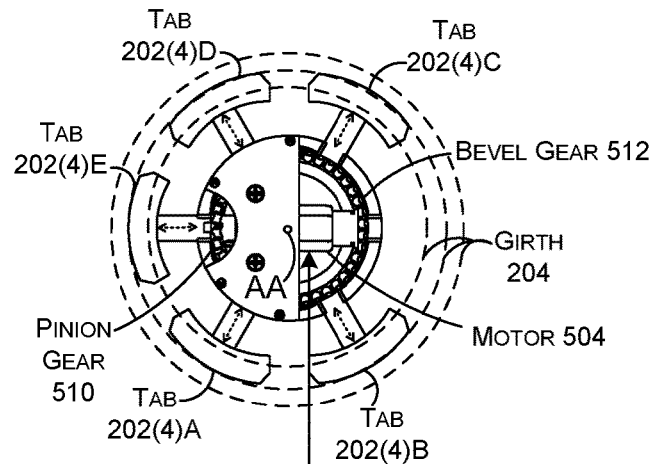

FIG. 8 offers further explanation relative to MLC device 110(1). FIG. 8 shows a schematic diagram relating to the MLC device and specifically to the expansion assemblies 116. The portion of the diagram inside the dashed line is explained relative to a single expansion assembly (expansion assembly 116(4) in this case) and can be replicated for each additional expansion assembly. The schematic diagram shows how the controller 720 can be communicatively coupled to other components. In this case the controller 720 can be manifest as a Teensy microcontroller. While explained relative to a single expansion assembly 116(4), the controller could control multiple expansion assemblies 116. For instance, a single controller could control all of the expansion assemblies 116 of the MLC device 110(1).

Beyond the controller 720 and the motor 504, the MLC device 110(1) can include or utilize a motor driver 802, an encoder 804, an interface application 806, a development platform 808, a 3D relational tracker 810, a 6-DOF sensor 812, and/or a finger touch sensor 814.

The encoder 804 can provide information to the controller 720 about how much power (e.g., force) is being applied by the motor 504 on the tabs 202. The motor driver 802 can indicate the current profile of the motor 504 and thus provide information relating to whether and how hard the user is squeezing the expansion assembly 116(4). Thus, the MLC device 110(1) can sense force via the current profile. Further, the current profile can be used to protect the motor 504 and/or other components from damage. For instance, the controller 720 can include a current threshold that reflects the maximum forces that system components are designed for. In a scenario where the current approaches the threshold, such as when a user is squeezing the expansion assembly 116(4) at the same time the motor 504 is trying to expand the girth of the expansion assembly, the controller 720 can take an action to protect the motor and/or other components. For instance, the controller can stop powering the motor. This can allow the user to force the tabs inward, backdriving the motor, rather than countering the active motor force.

This current profile can also be used to improve the perceived realism of the MLC device 110(1) in simulating different objects. For instance, consider, three similarly shaped virtual objects, such as a shovel handle, a paper towel roll cardboard tube, and a rubber hose. The controller 720 may initially cause the expansion assembly to expand or contract to a specific girth for each of these virtual objects. However, assume that the virtual object is the shovel handle and the user begins to squeeze the virtual shovel handle. Physical shovel handles do not compress and so the controller 720 may power the motor 504 to resist this squeezing force and maintain the girth as long as the user's squeezing does not cause the current to exceed the current threshold.

For the paper towel tube, the controller 720 may resist the squeezing force to a first current value and then stop powering the motor or reverse the direction of the powering to allow the user to 'crush' the virtual paper towel tube. In one case, the first current value can be obtained from a table that maps values relating to various objects.

In relation to the rubber hose, the controller 720 may again resist the squeezing by driving the motor 504 up to a certain current value at which the controller may reduce power to the motor to allow the user to reduce the dimension of the virtual rubber hose. When the user begins to reduce their squeezing (as reflected in a decrease in the current profile) the controller can increase the driving power to cause the rubber hose to be resilient (e.g., spring back to its original shape in the user's hand).

As mentioned above, the MLC device 110(1) may include various sensors, such as touch sensors on the tabs 202, represented here as conductive finger rest 814, but the force sensing can be obtained without sensors via the current profile. In combination, the touch sensors of the conductive finger rest 814 can indicate if the user is touching the expansion assemblies and the current profile from the motor driver 802 can indicate if and how hard the user is squeezing the expansion assemblies 116.

The controller 720 can control the motor 504 by selecting the driving power and the direction of rotation (e.g. counter-clockwise, 'Motor A" and clockwise, 'Motor B'). In this case, the motor can be a 12v DC gearmotor, such as a Pololu #4789, 15:1 gear ratio. Other motors can be employed. Motor rotation can be measured using a magnetic encoder, such as a Pololu #4760 mounted to the motor shaft. The motor 504 can be controlled by the controller 720 using motor driver 802, such as a TB9051FTG motor driver. Motor current can also be monitored by the motor driver 802, and proportionally output as an analog voltage (500 mV/A).

The controller 720 can govern sensing and actuation on the MLC device 110(1). The controller 720 can generate commands for the motor 504. Alternatively, the controller can receive commands from another device, such as over a USB Serial connection or a Bluetooth connection. Position control for each expansion assembly can be maintained using a 1000 Hz PID loop. An analog input can be employed for each expansion assembly 116 to monitor the current of each motor. A Fasttouch library can be used to sense user touch of an electrically-conductive finger rest. For instance, the conductive finger rest can be printed using conductive PLA, Proto-pasta CDP11705 in the top layer of the tabs 202. This information can be used to sense whether the user is currently grasping the MLC device 110(1).

One example MLC device implementation can use current information in three ways. First, when calibrating the device position, each expansion assembly 116 can be driven inward until a current spike is observed indicating full retraction and motor stalled state. Second, to prevent damaging motors 504 by drawing too much current, a safety threshold can be placed on the maximum current generated by a motor in response to a user squeezing the MLC device 110. In one example, if the user causes an individual expansion assembly to draw more than 0.6 Amps (by applying approximately 10 N of force) for over 1 second, power can be cut to that expansion assembly 116 for three seconds, after which it can attempt to reach its desired position again. When this threshold is reached, users can be notified either visually in VR or haptically through brief vibration of the motor. Finally, current measurements can be leveraged to render "squeeze-responsive" objects in VR. Unlike most existing shape displays which are purely output devices some MLC device implementations are able to trigger visuo-haptic events in response to applied force. This can be used to render objects that break or collapse above certain loads, or haptic user-interface (UI) elements such as buttons and switches.

In addition to current sensing, MLC devices 110 can also leverage finger touch sensor 814, such as capacitive touch sensing to obtain additional context from the user. Some example implementations can employ a single touch sensor for the entire controller 720 (located on the index finger expansion assembly 116(1)) to determine whether the user is grasping the rendered object or not. This can be used to ensure that shape-change (between different objects) primarily happens after the user has released the previous object.

In one example configuration, MLC devices 110(1) can connect to another device, such as a PC via USB Serial connection (115200 baud) and be powered via a 12V/3A wall power supply. In this example, an HTC Vive setup (head-mounted display and two base stations) can be used as the VR platform, though others can be employed. In this example, VR applications can be programmed in development platform 808, such as Unity 2019, which transmits appropriate device position commands to interface application 806 via user datagram protocol (UDP) or other protocol. The interface application 806 can then parse and forward commands to the controller 720 via a communication technology, such as USB Serial or Bluetooth. The MLC device 110(1) can send a device status (including touch state, motor currents, and/or expansion assembly positions) back to the development platform 808 at 100 Hz, for example.

3D relational trackers 810, such as VIVE lighthouse can sense relative positions of the MLC device 110(1) relative to headset 106 (See FIG. 1A). The six degree of freedom (6DOF) sensors 812, such as a VIVE tracker can sense position of the MLC device 110(1) relative to the X, Y, and Z axes as well as linear and rotational acceleration. The information from the 3D relational tracker 810 and the 6DOF sensor 812 can be utilized to determine the position of the MLC device 110(1) relative to virtual objects projected by the headset 106 and visible by the user wearing the headset and reaching for the virtual objects.

Example Use Scenarios

For purposes of explanation several use case scenarios are illustrated to show the potential of MLC devices 110 as graspable controllers for VR. These use case scenarios employ an application that allows users to freely pick up and interact with a variety of virtual objects.

Figure 9A:
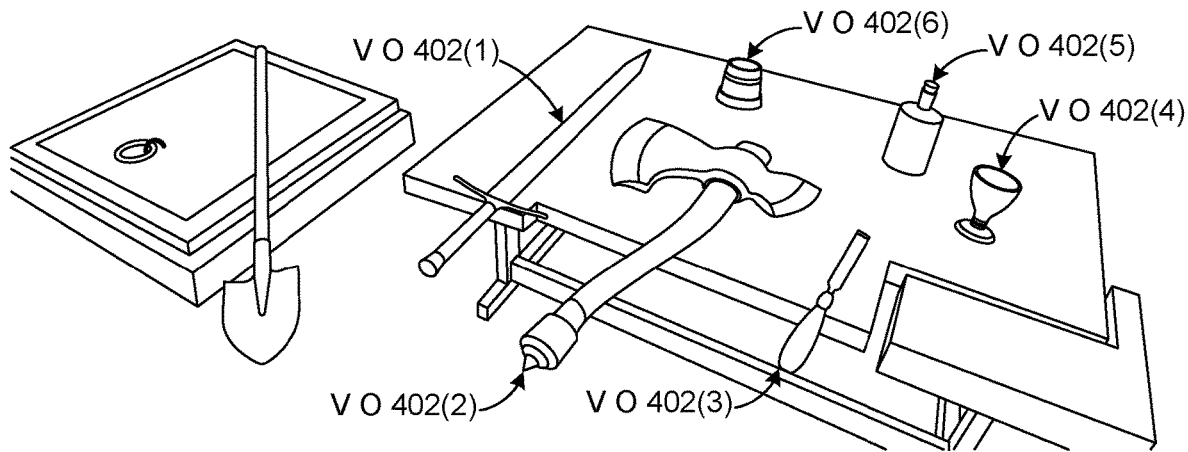

FIG. 9A shows a virtual scene 900 of a medieval game scenario. In the scene, virtual objects 402 are presented that the user can interact with. In this case, the user can pick up individual virtual objects 402 from a table in front of them. In this example, the virtual objects include a sword 402(1), an axe 402(2), a chisel 402(3), a chalice 402(4), a bottle 402(5), and wooden mug 402(6).

Figure 9B:
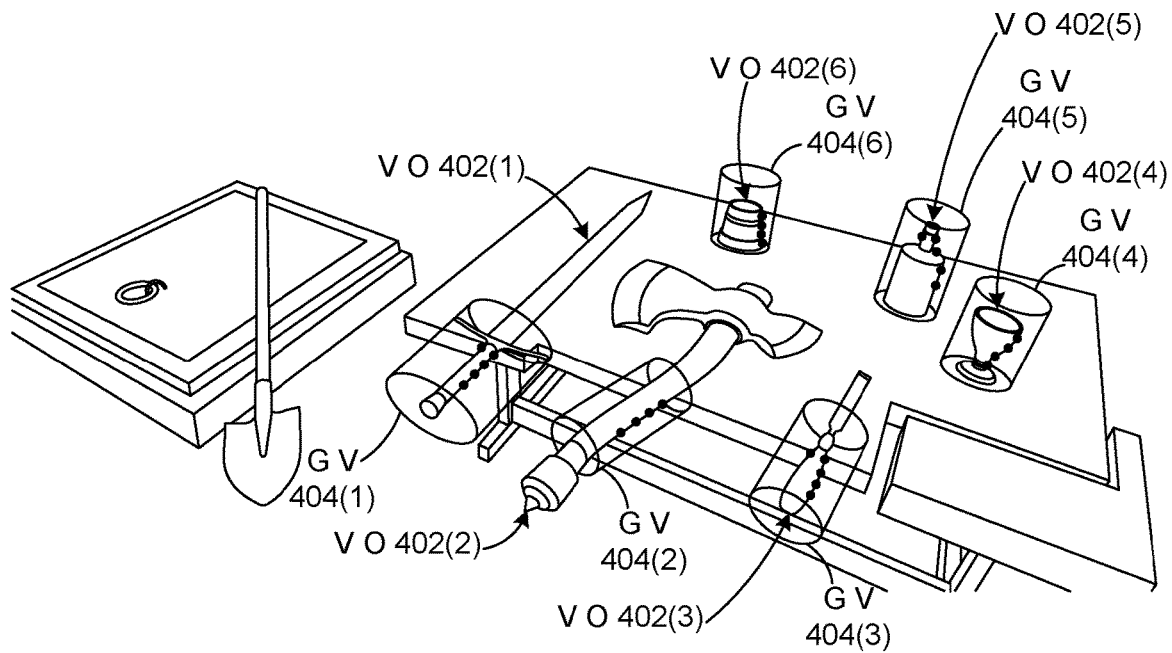

FIG. 9B shows the same scene with the grasp volumes 404 of the virtual objects 402 visualized. These grasp volumes 404 may or may not be visible to the user. Grasp volumes are described above relative to FIGS. 4A-4D. Various techniques can be used to determine the dimensions (e.g., girth) of the virtual object. For instance, one technique can involve the use of an object hidden from the user. For purposes of explanation, the hidden object can be referred to as a shape sensor. The shape sensor can be a cylinder of the same height as expansion assemblies employed in the MLC device. The cylinder can be twice as wide as the expansion assemblies, such as at their intermediate girth. For each virtual object 402, a shape sensor can be positioned on the desired graspable region. For each expansion assembly, a ray is cast inwardly from the appropriate point on the shape sensor's surface to determine the proper extension. (See the grasp volume 404 of FIG. 4A).

The user is able to reach for any of these virtual objects 402. If the user does reach for an individual virtual object, the system can predict their target virtual object. Information about the girths of the grasp volume 404 of the target virtual object can be utilized to generate corresponding commands. These commands can be sent to MLC device 110 for implementation at the appropriate time (e.g., in this implementation about 0.1 seconds before the user's hand is predicted to grasp the target virtual object).

Figure 10A:
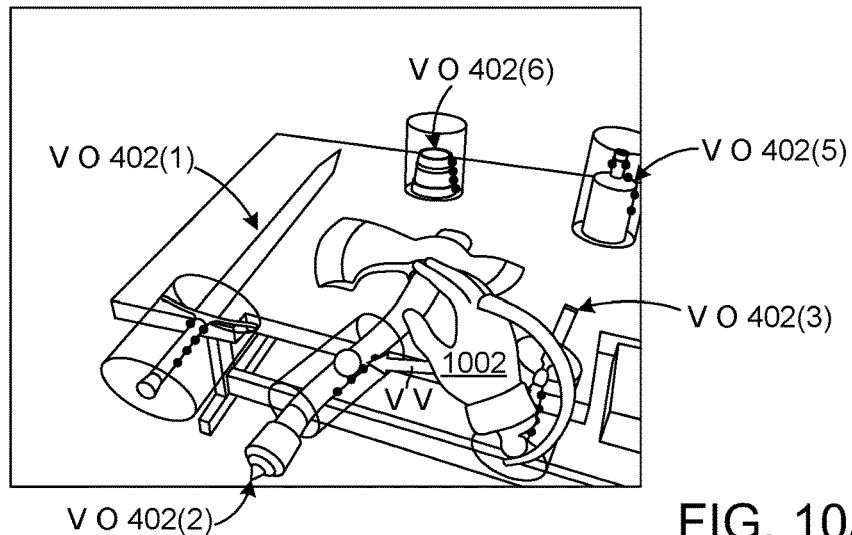
Figure 10B:
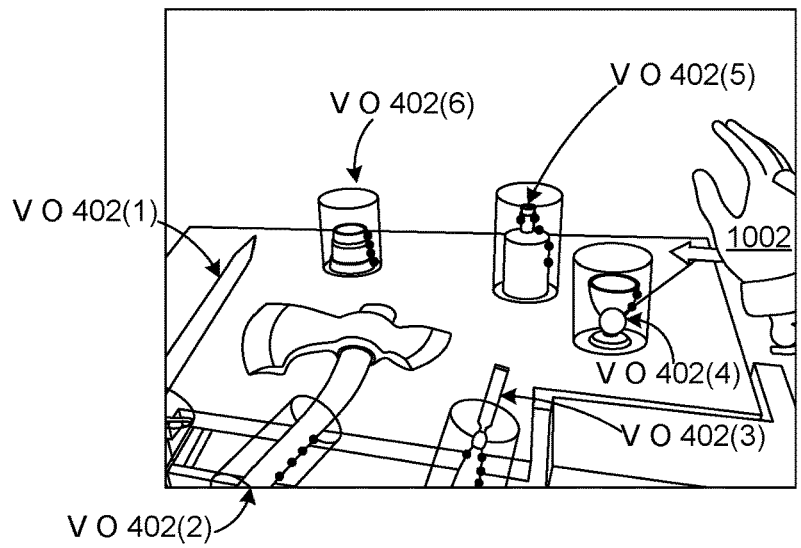
Figure 10C:
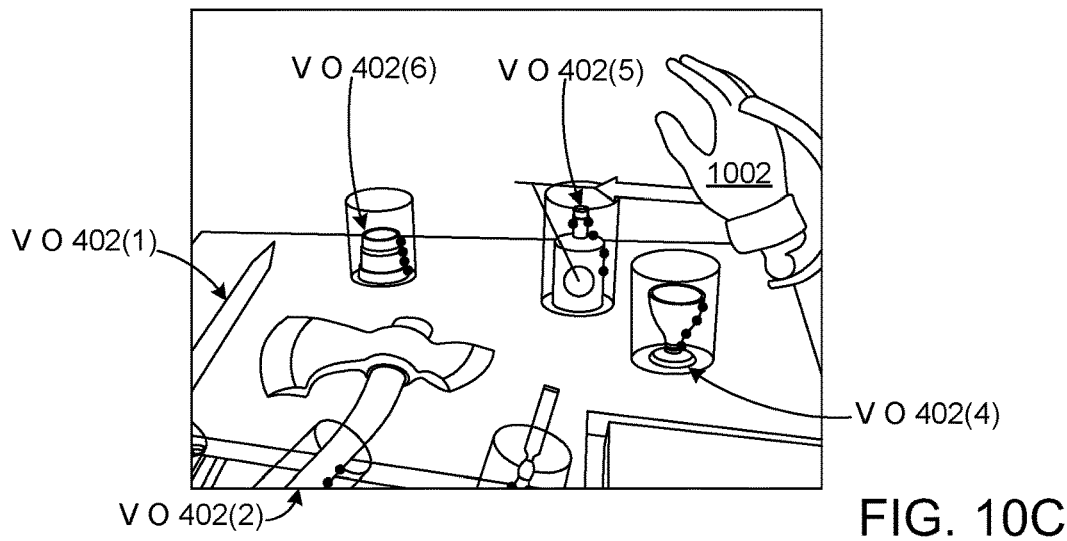

FIGS. 10A-10C collectively relate to predicting which virtual object 402 the user is reaching for. Various techniques can be used to predict which virtual object 402 the user is reaching for. For instance, one technique can utilize a velocity vector (V V) of their (physical) hand (108, FIG. 1A) (as tracked by the controller 720) smoothed using an exponential filter with a smoothing constant of 0.95, for example.

At each frame, the nearest graspable object to the ray defined by the (physical) hand and the filtered velocity direction can be considered to be the predicted target virtual object 402. If the open (physical) hand is reaching within 50 cm of the target, for example, a new shape command can be sent to the MLC device 110 to render the predicted target's shape (from the grasp volume). (Grasp volumes 404 are shown but not designated on FIGS. 10A-10C to avoid clutter on the drawing page. See FIG. 9B). Additionally, in some implementations new object shapes are only commanded if the touch sensor on the MLC device 110 indicates the user is not already grasping the MLC device (e.g., the user is reaching for something with an open hand).

Some implementations can leverage animations of a fully articulated virtual hand 1002 to further increase immersion in the application. When a virtual object 402 is registered as a grasp target and the user's (physical) hand (108, FIG. 1) enters its grasp volume 404, an animation is triggered visually rendering the grasping of the target virtual object 402 as the user closes their (physical) hand. If the user releases their grasp on the MLC device 110, the change is sensed and virtual hand 1002 opens, releasing the virtual object 402.

Some implementations can also leverage pressure sensing (via changes in measured motor current) to enable certain virtual objects 402 to be broken if a certain current threshold is passed. Once this threshold is reached on any expansion assembly 116, a breaking animation can be triggered and the MLC device 110 can fully retract (e.g., expansion assemblies can be driven to their minimum girth).

Some of the above concepts relate to graspable controllers (e.g., MLC devices 110) that can provide hand-scale shape displays to support whole-hand grasping of virtual objects and surfaces. Additionally, some MLC devices 110 can sense direct physical interactions with rendered objects in the form of touch and pressure sensing, both of which can be important for compelling dynamic physical interactions with virtual objects.

The described MLC devices 110 can operate in the "inside-out" paradigm for shape rendering, which allows devices to be more robust and compact than traditional exoskeletons. Inside-out devices also enable intuitive placement of components within a central device handle, avoiding external moving parts and free space impedance. MLC devices are not only useful for VR, but also for AR, as the compact in-hand design reduces occlusions of the real world around the user's hand. MLC devices can effectively deliver sizes and shapes that satisfy user expectations by simulating the size and/or shape of grasped virtual objects. Two examples are discussed below relative to FIGS. 11A-11B.

Figure 11A:
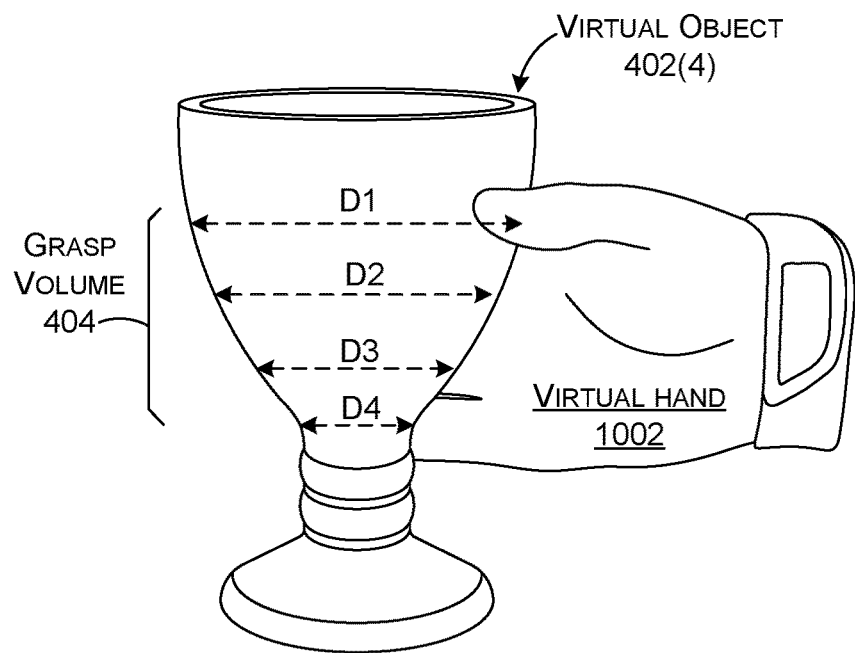
Figure 11B:
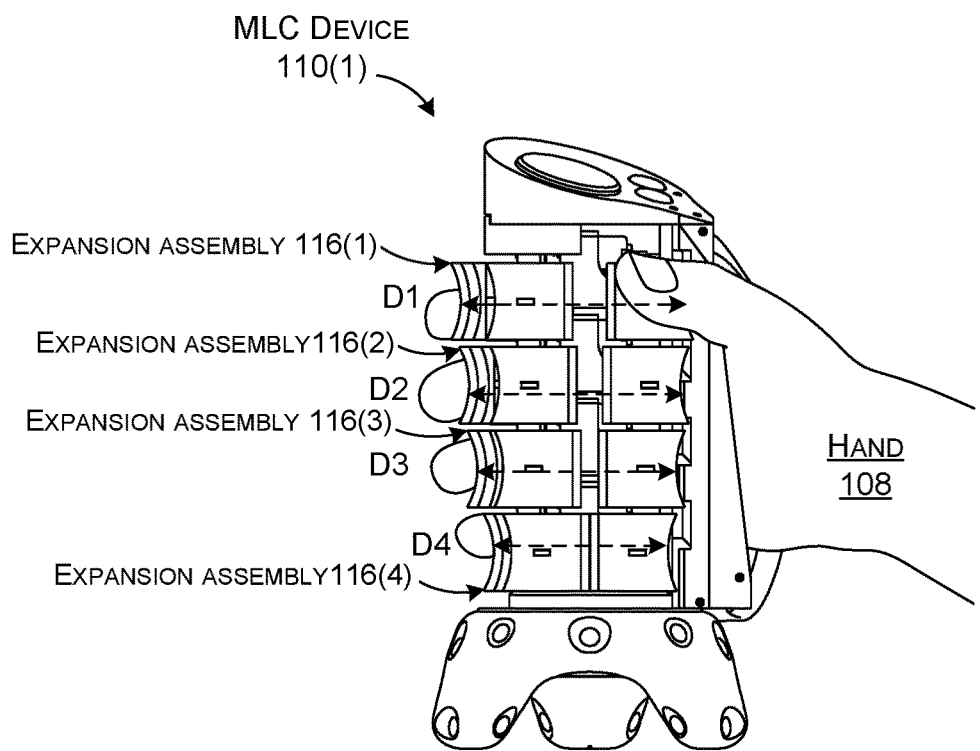

FIGS. 11A and 11B collectively illustrate an example configuration where MLC device 110(1) can simulate dimensions of a virtual object 402(4). FIG. 11A shows dimensions D1 through D4 associated with finger positions in the grasp volume 404 of virtual object 402(4).

FIG. 11B shows size adjustments of the expansion assemblies 116(1)-116(4) that can simulate the dimensions of the finger positions in the grasp volume 404. In this case, the dimensions D1-D4 of the expansion assemblies do not necessarily exactly match all of the dimensions D1-D4 of the grasp volume 404 virtual object 402(4). However, the MLC device 110(4) can successfully simulate the virtual object by having a similar size and profile. In this case, dimension D3 of expansion assembly 116(3) matches dimension D3 of virtual object 402(4). Further, dimension D4 of expansion assembly 116(4) is the smallest and the dimensions of the expansion assemblies get progressively larger going upward in a similar fashion to the dimensions of the grasp volume 404. These similar dimensions and similar profile, in combination with the visual appearance (e.g., visual reinforcement) of the virtual object 402(4) successfully cause the user to perceive that he/she is grasping the virtual object. Stated another way, the dominance of the visual sense enables grasped objects to be rendered slightly smaller or larger than the dynamic range of the device, as long as the shape is similar to the object.

Figure 12:
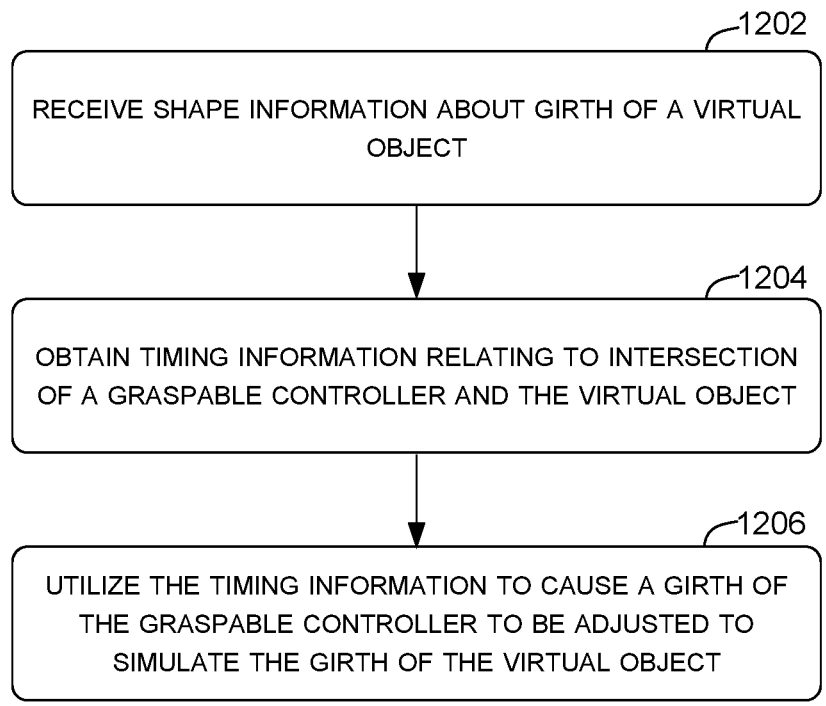
FIG. 12 shows a flowchart of an example control method, consistent with some implementations of the present concepts.

FIG. 12 shows a flowchart illustrating an example method 1200 relating to simulating a shape of a virtual object. In act 1202, the method can receive shape information about the girth of a virtual object. In one case, the received shape information can entail receiving radii of at least two points within a graspable volume of the virtual object. Other examples can include other dimensions relating to the girth of the virtual object.

In act 1204, the method can obtain timing information relating to the intersection of a graspable controller and the virtual object. In one example the obtaining timing information can entail predicting a time that a hand of the user holding (or retaining) the graspable controller will intersect the virtual object. In other cases, the timing information can be obtained from another entity, such as from another device.

In act 1206, the method can utilize the timing information to cause a girth of the graspable controller to be adjusted to simulate the girth of the virtual object. In one example, the timing information can entail utilizing the timing information to cause a first girth of the graspable controller to be adjusted independently of an adjacent second girth of the graspable controller. For instance, the graspable controller can entail regions to accept individual user fingers. Individual regions can have their girths adjusted to approximate or simulate regions of the virtual object that would be grasped by the individual fingers as the user's hand approaches the location of the virtual object.

Although the subject matter has been described in language specific to structural features and/or methodological acts, the subject matter defined in the appended claims is not necessarily limited to the specific features or acts described above. Rather, the specific features and acts described above are presented as example forms of implementing the claims, and other features and acts that would be recognized by one skilled in the art are intended to be within the scope of the claims.

Various examples are described above. Additional examples are described below. One example includes multiple expansion assemblies having independently adjustable girths and are stacked adjacent to one another along an axis and a controller configured to expand or contract the girths of the expansion assemblies to collectively approximate girths of an object.

Another example can include any of the above and/or below examples where the adjustable girths are circular.

Another example can include any of the above and/or below examples where the adjustable girths are elliptical.

Another example can include any of the above and/or below examples where the adjustable girths are irregularly shaped.

Another example can include any of the above and/or below examples where the multiple expansion assemblies are interposed between housing portions positioned along the axis and further comprising a retainer extending between the housing portions for retaining the device proximate to a user's hand.

Another example can include any of the above and/or below examples where individual expansion assemblies comprise multiple radially arranged tabs that can be moved toward and away from the axis.

Another example can include any of the above and/or below examples where the multiple radially arranged tabs of an individual expansion assembly are independently controllable to set a distance from the axis.

Another example can include any of the above and/or below examples where the multiple radially arranged tabs of an individual expansion assembly maintain uniform radial distances from the axis.

Another example can include any of the above and/or below examples where the device further comprises a radial cam that defines the uniform radial distances.

Another example can include any of the above and/or below examples where each tab comprises a cam follower that follows spiral cam surfaces of the radial cam to define the uniform radial distances.

Another example can include any of the above and/or below examples where the device further comprises a drive mechanism configured to rotate the radial cam.

Another example can include any of the above and/or below examples where the drive mechanism comprises an electric motor.

Another example can include any of the above and/or below examples where the device further comprises a controller configured to drive the electric motor and to monitor a current profile of the electric motor to detect squeezing forces imparted by a user on the tabs.

Another example includes a device comprising a set of tabs arranged around a focus, a drive mechanism, and a spiral cam coupled between the drive mechanism and the set of tabs, the spiral cam comprising pairs of opposing first and second cam surfaces, such that rotation of the spiral cam by the drive mechanism in a first direction of rotation causes individual first cam surfaces to force individual tabs away from the focus and rotation of the spiral cam by the drive mechanism in a second opposite direction causes individual second cam surfaces to force the individual tabs toward the focus.

Another example can include any of the above and/or below examples where the device further comprises another set of tabs arranged around another focus and another spiral cam configured to force the another set of tabs toward or away from the another focus.

Another example can include any of the above and/or below examples where the spiral cam and the another spiral cam are both coupled to the drive mechanism or further comprising another drive mechanism for driving the another spiral cam.

Another example includes a device implemented method comprising receiving shape information about a girth of a virtual object, obtaining timing information relating to intersection of a graspable controller and the virtual object, and utilizing the timing information to cause a girth of the graspable controller to be adjusted to simulate the girth of the virtual object.

Another example can include any of the above and/or below examples where receiving shape information about a girth of the virtual object comprises receiving radii of at least two points within a graspable volume of the virtual object.

Another example can include any of the above and/or below examples where obtaining timing information comprises predicting a time that a hand of a user holding the graspable controller will intersect the virtual object.

Another example can include any of the above and/or below examples where utilizing the timing information comprises utilizing the timing information to cause a first girth of the graspable controller to be adjusted independently of an adjacent second girth of the graspable controller.

The invention claimed is:

1. A device, comprising:
multiple expansion assemblies having independently adjustable elliptical or irregularly shaped girths and are stacked adjacent to one another along an axis; and,
a controller configured to expand or contract the girths of the expansion assemblies to collectively approximate girths of an object.

2. The device of claim 1, wherein the adjustable elliptical shaped girths are circular.

3. The device of claim 1, wherein the multiple expansion assemblies are interposed between housing portions positioned along the axis and further comprising a retainer extending between the housing portions for retaining the device proximate to a user's hand.

4. The device of claim 1, wherein individual expansion assemblies comprise multiple radially arranged tabs that can be moved toward and away from the axis.

5. The device of claim 4, wherein the multiple radially arranged tabs of an individual expansion assembly are independently controllable to set a distance from the axis.

6. The device of claim 4, wherein the multiple radially arranged tabs of an individual expansion assembly maintain uniform radial distances from the axis.

7. The device of claim 6, further comprising a radial cam that defines the uniform radial distances.

8. The device of claim 7, wherein each tab comprises a cam follower that follows spiral cam surfaces of the radial cam to define the uniform radial distances.

9. The device of claim 8, further comprising a drive mechanism configured to rotate the radial cam.

10. The device of claim 9, wherein the drive mechanism comprises an electric motor.

11. The device of claim 10, further comprising a controller configured to drive the electric motor and to monitor a current profile of the electric motor to detect squeezing forces imparted by a user on the tabs.

12. A device, comprising:
a set of tabs arranged around a focus;
a drive mechanism; and,
a spiral cam coupled between the drive mechanism and the set of tabs, the spiral cam comprising pairs of opposing first and second cam surfaces, such that rotation of the spiral cam by the drive mechanism in a first direction of rotation causes individual first cam surfaces to force individual tabs away from the focus and rotation of the spiral cam by the drive mechanism in a second opposite direction causes individual second cam surfaces to force the individual tabs toward the focus.

13. The device of claim 12, further comprising another set of tabs arranged around another focus and another spiral cam configured to force the another set of tabs toward or away from the another focus.

14. The device of claim 13, wherein the spiral cam and the another spiral cam are both coupled to the drive mechanism or further comprising another drive mechanism for driving the another spiral cam.

15. A device, comprising:
an upper housing portion and a lower housing portion that are intersected by an axis; and,
multiple expansion assemblies stacked along the axis between the upper housing portion and the lower housing portion and having independently adjustable girths, individual expansion assemblies comprising multiple radially arranged tabs that are moveable toward and away from the axis.

16. The device of claim 15, wherein the multiple radially arranged tabs are positioned around an entire perimeter of the individual expansion assemblies when viewed transverse to the axis.

17. The device of claim 15, wherein the multiple radially arranged tabs are positioned around a majority of a perimeter of the individual expansion assemblies when viewed transverse to the axis.

18. The device of claim 15, wherein the multiple expansion assemblies comprise four expansion assemblies and individual expansion assemblies are configured to accommodate an individual finger of a user grasping the device.

19. The device of claim 15, wherein all of the tabs of an individual expansion assembly are driven by a shared drive mechanism or where individual tabs of an individual expansion assembly are driven by dedicated drive mechanisms.

20. The device of claim 19, wherein the shared drive mechanism is coupled to the tabs via a bevel gear and a spiral cam.

* * * * *